United States Patent
Arigaya et al.

(10) Patent No.: US 9,434,253 B2
(45) Date of Patent: Sep. 6, 2016

(54) DAMPER AND OPERATION UNIT

(71) Applicant: OILES CORPORATION, Tokyo (JP)

(72) Inventors: Hideto Arigaya, Fujisawa (JP);
Katsutoshi Kumazawa, Fujisawa (JP);
Kentaro Yamauchi, Fujisawa (JP);
Daisuke Yoshimoto, Fujisawa (JP)

(73) Assignee: OILES CORPORATION, Tokyo (JP)

( * ) Notice: Subject to any disclaimer, the term of this patent is extended or adjusted under 35 U.S.C. 154(b) by 0 days.

(21) Appl. No.: 14/380,928

(22) PCT Filed: Feb. 21, 2013

(86) PCT No.: PCT/JP2013/054397
§ 371 (c)(1),
(2) Date: Aug. 25, 2014

(87) PCT Pub. No.: WO2013/145973
PCT Pub. Date: Oct. 3, 2013

(65) Prior Publication Data
US 2015/0013494 A1    Jan. 15, 2015

(30) Foreign Application Priority Data

Mar. 27, 2012 (JP) ................. 2012-072487
Mar. 27, 2012 (JP) ................. 2012-072488

(51) Int. Cl.
| | |
|---|---|
| G05G 1/30 | (2008.04) |
| G05G 5/03 | (2008.04) |
| B60K 26/02 | (2006.01) |
| F16F 13/00 | (2006.01) |
| F16F 7/09 | (2006.01) |

(Continued)

(52) U.S. Cl.
CPC ............. *B60K 26/021* (2013.01); *F16F 7/095* (2013.01); *F16F 13/005* (2013.01); *G05G 1/44* (2013.01); *G05G 5/03* (2013.01); *B60K 2026/023* (2013.01); *B60T 7/04* (2013.01); *Y10T 74/20528* (2015.01); *Y10T 74/20534* (2015.01)

(58) Field of Classification Search
CPC .......... B60K 26/021; B60K 2026/023; G05G 1/44; G05G 5/03; B60T 7/04; B60T 7/06; F16F 7/095; F16F 13/005; Y10T 74/2101; Y10T 74/20528; Y10T 74/20534
See application file for complete search history.

(56) References Cited

U.S. PATENT DOCUMENTS 6,240,801 B1 * 6/2001 Kojima ................ B60K 26/021
                                                       267/155
6,591,712 B2 * 7/2003 Goto ......................... B60T 7/06
                                                        74/514

(Continued)

FOREIGN PATENT DOCUMENTS

| CN | 1341236 A | 3/2002 |
| CN | 1657334 A | 8/2005 |

(Continued)

*Primary Examiner* — Adam D Rogers
(74) *Attorney, Agent, or Firm* — patenttm.us

(57) ABSTRACT

A damper restricts pivot pin rotation associated with operation of an operating section, wherein friction resistance that impedes the pivot pin rotation is changed in stepped fashion. When the pivot pin rotates in direction α due to depression of an accelerator pedal, a slide cam shifts an edge section of an inclined cam surface away from a rotating cam while staying in contact with a gradual first inclined region of the rotating cam's inclined cam surface. Torque around the axis of the pivot pin is produced, the entire region of the slide cam's inclined cam surface comes into contact with a steep second inclined region of the rotating cam's inclined cam surface upon accelerator pedal depression to a prescribed position (the pivot pin has rotated by a prescribed angle θ1 in direction α), and the torque around the axis of the pivot pin rapidly increases.

11 Claims, 18 Drawing Sheets

(51) Int. Cl.
*G05G 1/44* (2008.04)
*B60T 7/04* (2006.01)

(56) References Cited

U.S. PATENT DOCUMENTS

2002/0157495 A1 10/2002 Goto et al.
2014/0217658 A1* 8/2014 Kumazawa .............. G05G 5/03
267/140.11

FOREIGN PATENT DOCUMENTS

| CN | 101965285 A | | 2/2011 |
|----|----|----|----|
| JP | 1991168337 A | | 7/1991 |
| JP | 1999321374 A | | 11/1999 |
| JP | 1999350985 A | | 12/1999 |
| JP | 2001051737 A | | 2/2001 |
| JP | 2002012052 A | * | 1/2002 |
| JP | 2002087106 A | | 3/2002 |
| JP | 2013203165 A | * | 10/2013 |

* cited by examiner

Fig.12
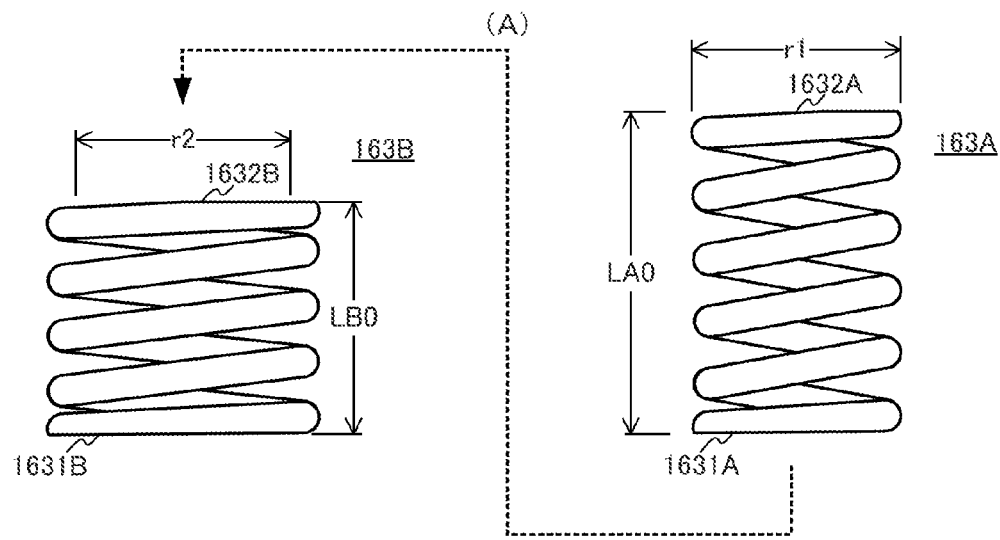
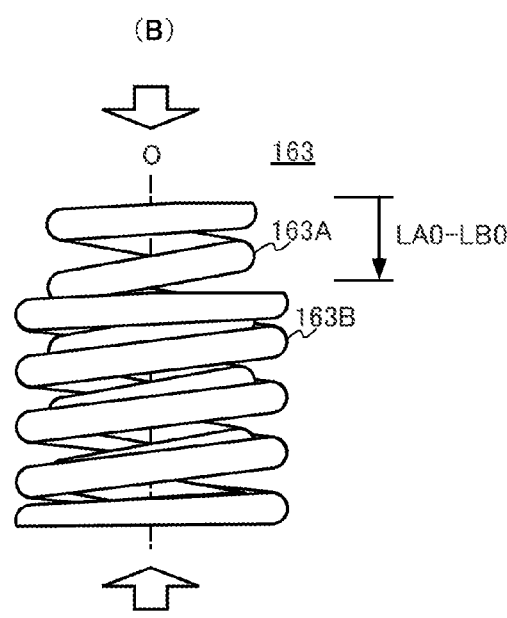
(B)
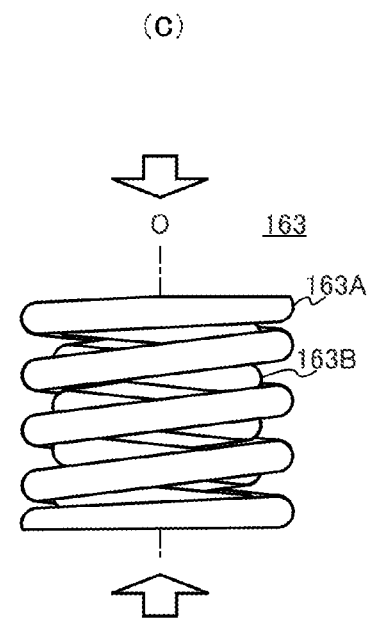
(C)

Fig.14
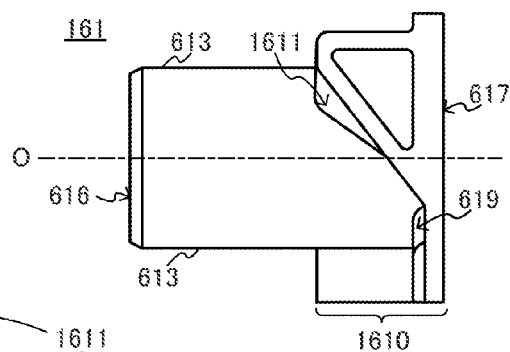
(A)
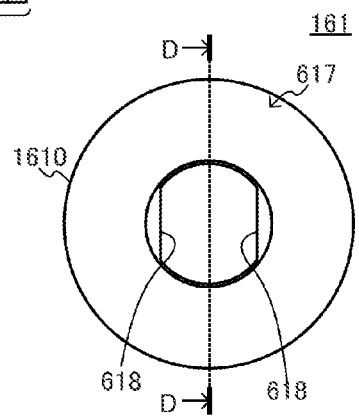
(C)
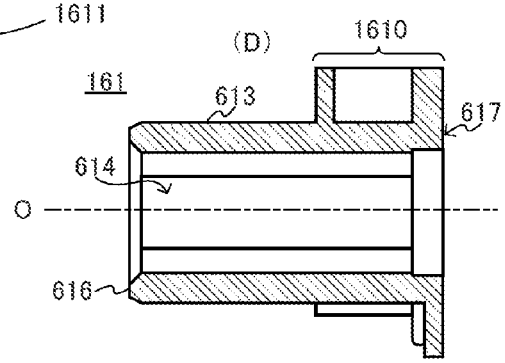
(D)
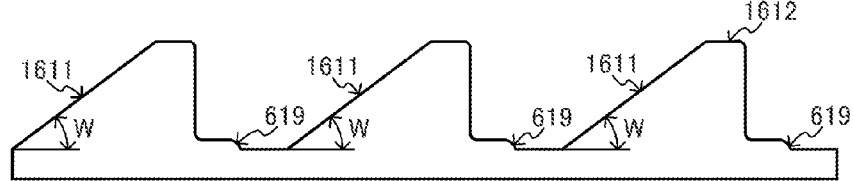
(E)

DAMPER AND OPERATION UNIT

TECHNICAL FIELD

The present invention relates to structure of a damper that can notify a user of occurrence of a prescribed event by a tactile signal in an operation unit that receives a user's manual operation at an operating part.

BACKGROUND ART

Patent Literature 1 describes an accelerator pedal unit that uses hysteresis characteristics of a damper having a pair of cams so that excessive pressing of the accelerator pedal is impeded by applying a suitable load against pressing of the accelerator pedal and a strain on a foot of a driver is reduced when the accelerator pedal is held at an almost-constant position.

In this accelerator pedal unit, rotation of an accelerator pedal arm is transmitted to a rotating shaft of the damper through a transmission mechanism including a link member and the like so that rotations of the accelerator pedal arm in both directions are damped. In detail, one end of the link member is fixed to the rotating shaft of the damper so that rotation of the link member causes rotation of the rotating shaft of the damper. On the other hand, an engaging member is fixed to the accelerator pedal arm at its opposite end across a rotating shaft of the accelerator pedal arm from the accelerator pedal. This engaging member is slidably held by the link member. Accordingly, when the accelerator pedal arm rotates, the rotating shaft of the damper is rotated through the link member in the direction depending on the rotation direction of the accelerator pedal. Owing to the hysteresis characteristics of the damper, an appropriate load is given at the time of pressing the accelerator pedal while the load is reduced at the time of return of the accelerator pedal (Paragraphs 0071-0084 and FIGS. 13-19, for example).

CITATION LIST

Patent Literature

Patent Literature 1: Japanese Unexamined Patent Application Laid-Open No. 2002-12052

SUMMARY OF INVENTION

Technical Problem

Excessive pressing of an accelerator pedal increases the energy expenditure rate of an automobile, and is undesirable from the viewpoint of traveling energy cost reduction or the like. Thus, in order to pursue so-called eco-driving, it is necessary for a driver to adjust the degree of pressing of an accelerator pedal while constantly grasping the traveling conditions of his automobile according to visual information obtained from, for example, an eco-meter in the instrument panel when the automobile is moving.

However, the convenience of a driver is improved if the driver can grasp more intuitively a signal of prompting energy saving driving without confirming display on an instrument panel. This does not apply only to an automobile, and it is convenient if a user who manually operates an operating part can intuitively grasp a signal that notifies the user of occurrence of a prescribed event.

The present invention has been made considering the above situation. An object of the invention is to provide an operation unit that receives user's manual operation at an operating part and can give an intuitively perceivable signal conveying notice of occurrence of a prescribed event, and a damper suitable for use in the operation unit.

Solution to Problem

To solve the above problems, according to the present invention, a pivot pin, which rotates in conjunction with an operating part for receiving a user's manual operation, is connected with a damper for damping rotation of the pivot pin, and force of the damper to damp rotation of the pivot pin increases rapidly at a time when the pivot pin is rotated to a prescribed rotation angle.

For example, the present invention provides a damper for damping rotation of a rotating shaft, comprising:

a pair of cam members each having an inclined cam face inclined with respect to a rotation direction of the rotating shaft, upon a torque of the rotating shaft being transmitted to the cam members, the cam members rotating relative to each other about an axis of the rotating shaft and moving relative to each other in an axial direction of the rotating shaft;

a housing part housing the pair of cam members and having an inner side surface on which the pair of the cam members moving and rotating relative to each other slide; and a friction resistance changing means changing a friction resistance impeding relative rotation of the pair of cam members stepwise by changing, in a stepwise manner, force of pressing the pair of cam members against an end portion of the housing part with increase of a relative rotation angle of the pair of cam members while pressing the pair of the cam members in the axial direction of the rotating shaft against the housing part at the end portion located in the axial direction of the rotating shaft so as to allow the pair of cam members to press against each other at the inclined cam faces.

Here, the friction resistance changing means may comprise:

an elastic body being placed within the housing part so as to be compressed in the axial direction of the rotating shaft by increase of an amount of a relative movement of the pair of cam members in the axial direction, biasing the pair of cam members in the axial direction of the rotating shaft; and at least two inclined areas being formed in the inclined cam face of at least one of the pair of cam members, being inclined at different angles from each other with respect to the direction of the relative rotation of the pair of cam members, and being arranged in the direction of the relative rotation of the pair of cam members.

Or the friction resistance changing means may comprise an elastic means placed within the housing part so as to be compressed in the axial direction of the rotating shaft by increase of a relative moving amount of the pair of cam members in the axial direction, the elastic means biasing the pair of cam members in the axial direction of the rotating shaft by restoring force; and an elastic coefficient of the elastic means may increase stepwise with increase of a compression amount of the elastic means.

Further, the present invention provides an operation unit for receiving a manual operation at an operating part from a user, wherein;

the operation unit comprises;

an arm having the operating part;

a pivot pin, the arm being fixed to the pivot pin so that the operating part is located at a position away from an axis;

a bracket holding the pivot pin rotatably about the axis of the pivot pin by force to be given to the operating part by the manual operation; and a damper damping rotation of the pivot pin; and the damper comprises;

a pair of cam members each having an inclined cam face inclined with respect to a rotation direction of the pivot pin, upon a torque of the pivot pin being transmitted to the cam members, the cam members rotating relative to each other about the axis of the pivot pin and moving relative to each other in an axial direction of the pivot pin with the inclined cam faces in sliding contact with each other;

a housing part being fixed to the bracket and housing the pair of cam members, housing part having an inner side surface, the pair of the cam members sliding on the inner side surface while moving and rotating relative to each other;

a friction resistance changing means changing a friction resistance impeding relative rotation of the pair of cam members stepwise by changing, in a stepwise manner, force of pressing the pair of cam members against an end portion of the housing part with increase of an angle of relative rotation of the pair of cam members while pressing the pair of the cam members in the axial direction of the pivot pin against the housing part at the end portion located in the axial direction of the pivot pin so as to allow the pair of cam members to press against each other at the inclined cam faces.

Here, the friction resistance changing means may comprise:

an elastic body being placed within the housing part so as to be compressed in the axial direction of the pivot pin by increase of a relative moving amount of the pair of cam members in the axial direction, biasing the pair of cam members in the axial direction of the pivot pin; and at least two inclined areas being formed in the inclined cam faces of at least one of the pair of cam members, being inclined at different angles from each other with respect to a direction of the relative rotation of the pair of cam members, and being arranged in the direction of the relative rotation of the pair of cam members.

Further, the friction resistance changing means may comprise an elastic means being placed within the housing part so as to be compressed in the axial direction of the pivot pin by increase of a relative moving amount of the pair of cam members in the axial direction and biasing the pair of cam members in the axial direction of the pivot pin by restoring force so as to allow the inclined cam faces of the pair of cam members to press against each other; and an elastic coefficient of the elastic means may increase stepwise with increase of a compression amount of the elastic means.

Advantageous Effects of Invention

According to the present invention, a damper connected to a pivot pin rotating in conjunction with an operating part for receiving user's manual operation increases force of damping rotation of the pivot pin at a time when the pivot pin rotates to a prescribed rotation angle. Accordingly, the user can detect a change in feeling of operation of the operating part by tactile sensation. Thus, for example, in an application case where the operation unit is an accelerator pedal unit having an accelerator pedal as an operating part, it is possible to increase a load on a foot with which a driver presses the accelerator pedal at a time when the accelerator pedal is pressed to a position where the energy expenditure rate of an automobile increases to a prescribed level. By this, while driving the automobile, the driver can detect a change in operational feeling of the accelerator pedal as a signal for energy-saving driving of the automobile. Thus, while driving the automobile, the driver can intuitively perceive the signal for energy-saving driving of the automobile through pressing operation of the accelerator pedal.

BRIEF DESCRIPTION OF DRAWINGS

FIG. 12(A) is a view for explaining structure of a combination spring 163, FIG. 12(B) a view illustrating a state of the combination spring 163 before increase of the spring constant, and FIG. 12(C) a view illustrating a state of the combination spring 163 having the increased spring constant;

FIGS. 14(A), 14(B) and 14(C) are a front view and left and right side views of a rotating cam 161, FIG. 14(D) a D-D cross-section of FIG. 14(C), and FIG. 14(E) a view illustrating schematically a profile shape of a cam face 1612 on a pitch circle 615 centering at an axis O;

DESCRIPTION OF EMBODIMENTS

Figure 1:
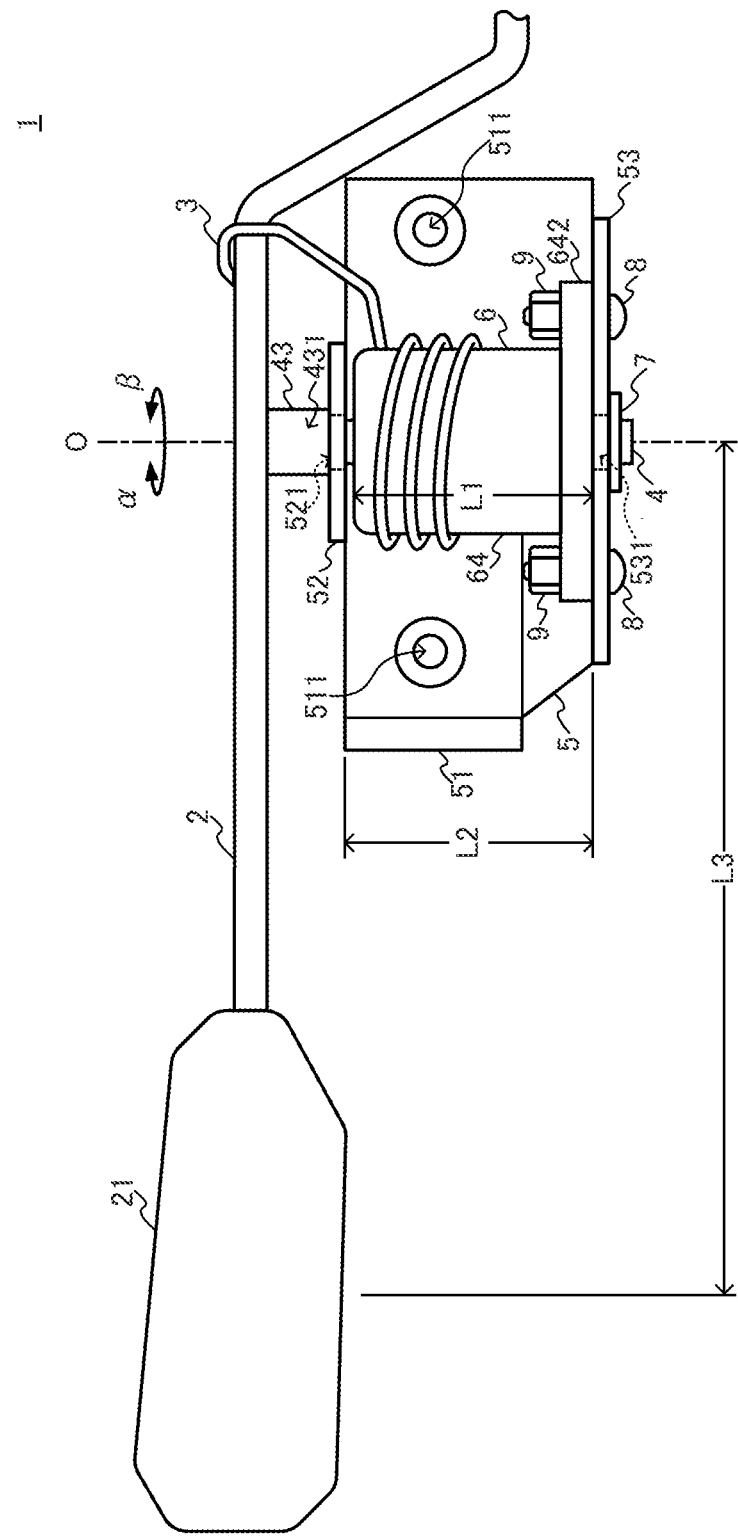
FIG. 1 is a view illustrating schematic configuration of a holding portion of an accelerator pedal arm 2 in an accelerator pedal unit 1 according to a first embodiment of the present invention.

In the following, embodiments of the present invention will be described referring to the drawings.

First Embodiment

First, structure of an accelerator pedal unit 1 according to the present embodiment and structure of a damper 6 used in the accelerator pedal unit 1 will be described.

FIG. 1 is a view illustrating schematic configuration of a holding portion of an accelerator pedal arm 2 in the accelerator pedal unit 1 according to the present embodiment.

As illustrated, the accelerator pedal unit 1 of the present embodiment comprises: an accelerator pedal arm 2, at one end portion of which an accelerator pedal 21 as an operating part for receiving driver's operation is fixed; a pedal pivot pin 4, to which the accelerator pedal arm 2 is fixed so that the accelerator pedal 21 is located at a prescribed distance L3 from an axis O; a pedal bracket 5, which holds the pedal pivot pin 4 rotatably in both directions α and β about the axis O so that the accelerator pedal arm 2 swings by operation (i.e. pressing and releasing) of the accelerator pedal 21, and is fixed to a body (not shown) of an automobile; a retaining ring 7 for preventing dropping-off of the pedal pivot pin 4 from the pedal bracket 5; a spring 3, whose both end portions are connected to the accelerator pedal arm 2 and the pedal bracket 5 so that the spring 3 is compressed with the press down of the accelerator pedal 21, and which makes the accelerator pedal arm 2 (which has been rotated about the axis O of the pedal pivot pin 4 by pressing the accelerator pedal 21) return to an initial position by the elastic force of the spring 3 when the accelerator pedal 21 is released; and a detection part (not shown), which includes a potentiometer and the like for detecting an angle of rotation θ about the axis O of the pedal pivot pin 4 and outputting the detected angle to the outside.

Further, the accelerator pedal unit 1 further comprises: a damper 6 in which resisting force for damping rotation of the pedal pivot pin 4 increases stepwise according to the angle θ of the rotation of the pedal pivot pin 4, in order that a suitable load is applied on a foot with which driver presses down the accelerator pedal 21, but the load on the driver's foot becomes rapidly heavier by at least tactually-detectable magnitude at the time when the accelerator pedal 21 is pressed to a position where the energy expenditure rate of the automobile deteriorates to a prescribed level (or at the time when the pedal pivot pin 4 rotates to a prescribed angle θ1 in the prescribed direction α about the axis O of the pedal pivot pin 4); and bolts 8 and nuts 9 for fixing the damper 6 to the pedal bracket 5.

In the following, these component parts 2-9 will be described. However, detailed description will be omitted with respect to parts similar to those in an ordinary accelerator pedal unit, such as the accelerator pedal arm 2, the spring 3, the retaining ring 7, the detection part, and the like. In the following, the direction α in which the pedal pivot pin 4 rotates about its axis O at the time of pressing the accelerator pedal 21 is called the normal rotation direction α, and the direction β in which the pedal pivot pin 4 rotates about its axis O at the time of releasing the accelerator pedal 21 is called the reverse rotation direction β.

Figure 2:
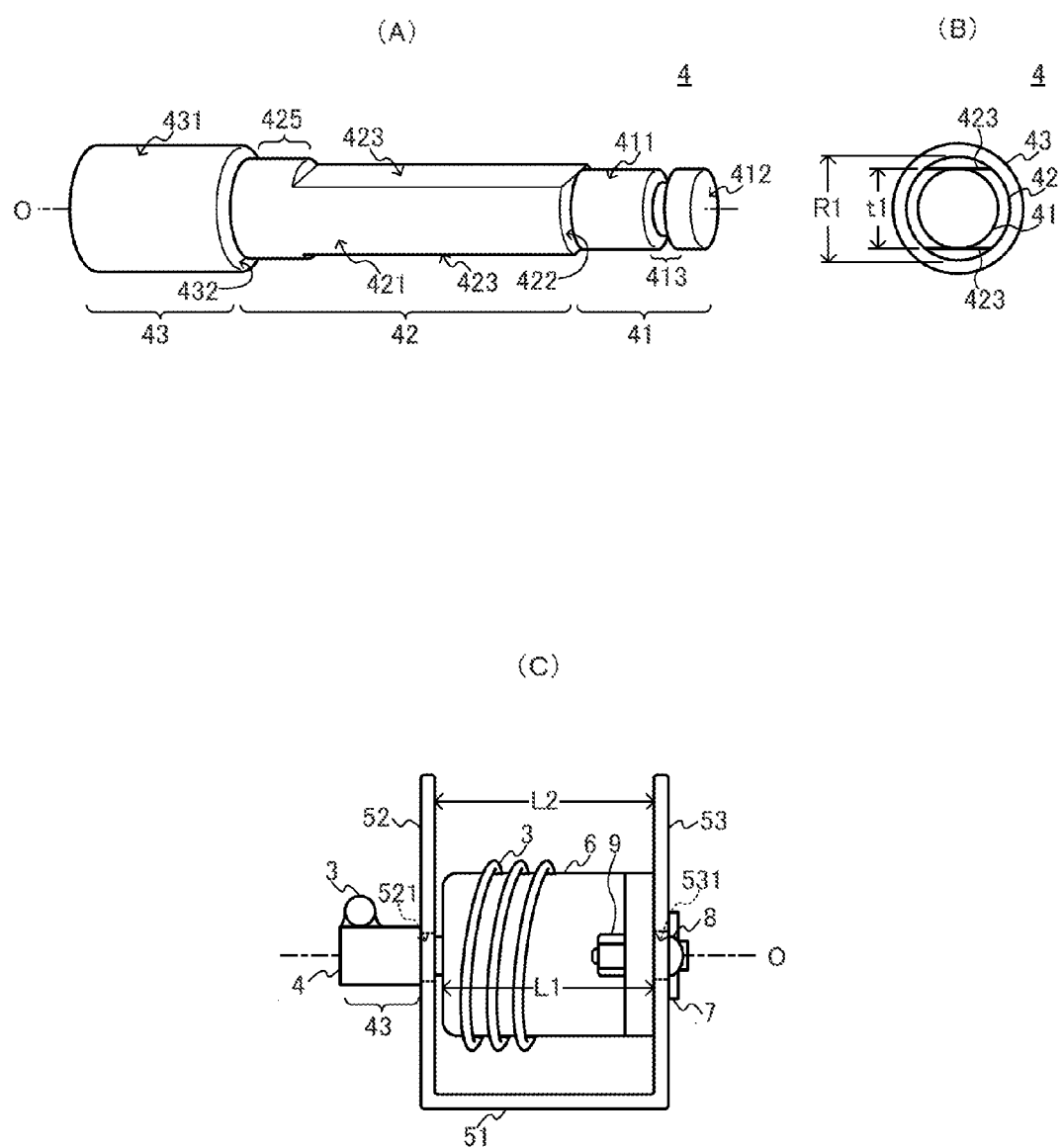
FIGS. 2(A) and 2(B) are an external view and a right side view of a pedal pivot pin 4, and FIG. 2(C) a view illustrating conceptually a state of the pedal pivot pin 4 fitted in a pedal bracket 5.

FIGS. 2(A) and 2(B) are an external view and a right side view of the pedal pivot pin 4, and FIG. 2(C) a view illustrating conceptually a state of the pedal pivot pin 4 fitted in the pedal bracket 5.

As illustrated, the pedal pivot pin 4 is a stepped pin with integrally and concentrically formed three cylindrical shaft sections 41-43 having respective outer diameters different from one another. In detail, the pedal pivot pin 4 comprises a support section 41, a damper connecting section 42 having a larger diameter than that of the support section 41, and a pedal arm fixing section 43 having a larger diameter than that of the damper connecting section 42, successively from the side of an end face 412.

On the outer periphery 431 of the pedal arm fixing section 43, is fixed the accelerator pedal arm 2 arranged in the direction crossing the axis O of the pedal pivot pin 4. Accordingly, interlocking with swinging of the accelerator pedal arm 2, the pedal pivot pin 4 rotates in both directions α and β about the axis O of the pedal pivot pin 4.

The damper connecting section 42 is formed integrally with an end face 432 of the pedal arm fixing section 43, and the outer circumference 421 of the damper connecting section 42 is, along the direction of the axis O, cut off to have two flat surfaces at width-across-flat t1 which is nearly equal to as the outer diameter R2 of the support section 41, extending from a step surface (an end face of the damper connecting section 42) 422 produced by an outer diameter difference between that section 42 and the support section 41 to a position that does not reach a step surface (the end face of the pedal arm fixing section 43) 432 produced by an outer diameter difference between that section 42 and the pedal arm fixing section 43. That is to say, on the side of the pedal arm fixing section 43 of the outer circumference 421 of the damper connecting section 42, is formed a support area 425 having cylindrical surface to be supported by one side plate 52 of the below-described two side plates 52 and 53 of the pedal bracket 5; and on the side of the support section 41 from this support area 425, are formed the two flat surfaces 423 opposed to each other with width-across-flat t1 nearly same as the outer diameter R2 of the support section 41.

The support section 41 is formed integrally with the end face 422 of the damper connecting section 42. In the outer circumference 411 of the support section 41, is formed a groove 413 in the circumferential direction for fitting the retaining ring 7 at a least distance L2 (See FIG. 1) between the two side plates 52 and 53 of the pedal bracket 5 from the step surface (the end face of the pedal arm fixing section 43) 432 formed by the outer diameter difference between the pedal arm fixing section 43 and the damper connecting section 42.

The pedal pivot pin 4 having the above-described shape is inserted, first the side of the support section 41, through a pin support hole 521 of the one side plate 52 of the pedal bracket 5, through the damper 6 fixed to the other side plate 53 of the pedal bracket 5, and through a pin insertion hole 531 of the other side plate 53 of the pedal bracket 5, and rotatably supported by the two side plates 52 and 53 of the pedal bracket 5 at two positions, i.e. at the support area 425 of the damper connecting section 42 and at the support section 41. In this state, the two flat surfaces 423 of the damper connecting section 42 are contained in the damper 6 fixed to the other side plate 53 of the pedal bracket 5. Inside the damper 6, the two flat surfaces 423 of the damper connecting section 42 face respective flat surfaces 618 of the inner wall of the below-described rotating cam 61. Accordingly, when the pedal pivot pin 4 rotates about its axis O associated with swinging of the accelerator pedal arm 2, the flat surfaces 423 of the damper connecting section 42 immediately make the rotating cam 61 rotate due to contact with the respective opposed flat surfaces 618 of the inner wall of the rotating cam 61. Thus, as soon as the accelerator pedal 21 is pressed down, the damper 6 starts damping of rotation of the pedal pivot pin 4, to apply a suitable load on the foot of the driver who presses the accelerator pedal 21.

Figure 9:
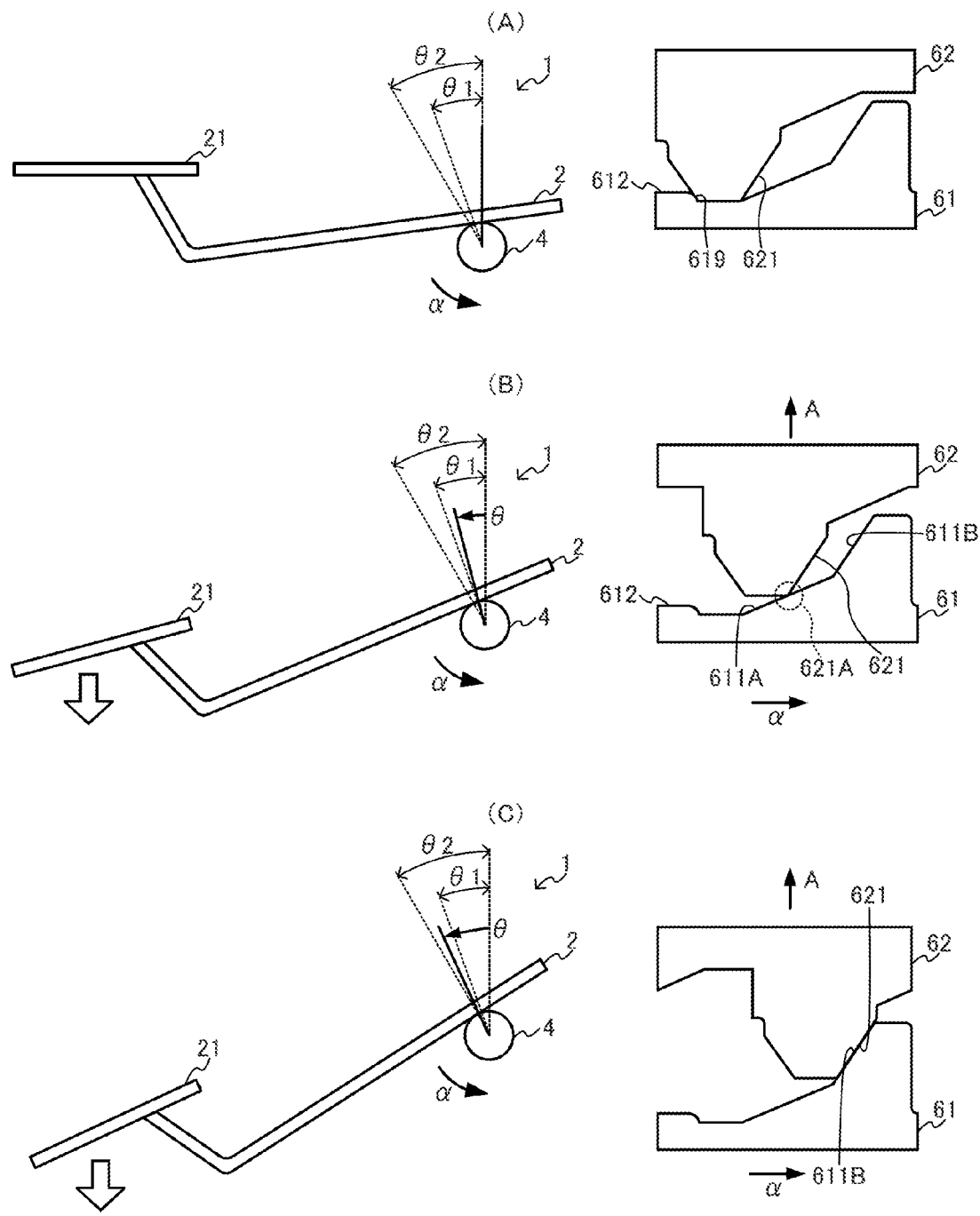
FIGS. 9(A), 9(B) and 9(C) are views for explaining two-stage damping motion of the damper 6 associated with pressing the accelerator pedal 21.

As illustrated in FIG. 1, the pedal bracket 5 integrally comprises: a bottom plate 51, which is fixed to an automobile body; and the two side plates 52 and 53, which support the pedal pivot pin 4 rotatably in both directions α and β. Although not shown, the pedal bracket 5 further comprises a stopper, which comes in contact with the other end portion (the end portion opposite to the accelerator pedal 21 with respect to the pedal pivot pin 4) of the rotating accelerator pedal arm 2 in the normal rotation direction α of the pedal pivot pin 4 at a prescribed position. Contact between this stopper and the other end portion of the accelerator pedal arm 2 prevents the pedal pivot pin 4 from rotating more than a prescribed angle θ2 (See FIG. 9) in the normal rotation direction α.

In the bottom plate 51, are formed through-holes 511 at a plurality of positions corresponding to threaded holes in the automobile body. By screwing bolts inserted through these through-holes into the threaded holes in the automobile body, the pedal bracket 5 is fixed to the automobile body at a prescribed mounting position.

A pin support hole 521, whose diameter is smaller than that of the pedal arm fixing section 43 of the pedal pivot pin 4 and larger than that of the damper connecting section 42, is formed in the one side plate 52 of the two side plates 52 and 53. The other side plate 53 is placed across the one side plate 52 from the accelerator pedal arm 2 so as to face the one side plate 52 at a distance L2 greater than the case length (the distance L1 between both end faces 6410A and 6410B of a case body 641) of the damper 6. Further, in the other side plate 53, are formed the pin support hole 531 and bolt insertion holes (not shown) positioned on both sides of the pin support hole 531. Here, the pin support hole 531 is concentric with the pin support hole 521 of the one side plate 52 and has a larger diameter than that of the support section 41 of the pedal pivot pin 4.

The damper 6 is placed between the two side plates 52 and 53, and fixed to the other side plate 53 by tightening of nuts 9 and the bolts 8 inserted through bolt insertion holes 6421 in flange portions 642 of the case 64 and the bolt insertion holes in the other side plate 53. In this state, the pedal pivot pin 4 is inserted, first the side of the support section 41, through the pin support hole 521 of the one side plate 52 until the groove 413 of the support section 41 comes out of the pin support hole 531 of the other side plate 53. As a result, as described above, the pedal pivot pin 4 is rotatably supported in the pin support holes 521 and 531 of the two side plates 52 and 53 at the two positions, i.e. at the support area 425 of the damper connecting section 42 and at the support section 41, in a state that the two flat surfaces 423 of the damper connecting section 42 are contained in the damper 6 fixed to the other side plate 53. Then, the retaining ring 7 having an outer diameter larger than the pin support hole 531 of the other side plate 53 is fitted in the groove 413 of the support section 41, to prevent dropping-off of the pedal pivot pin 4 out of the pedal bracket 5.

Figure 3:
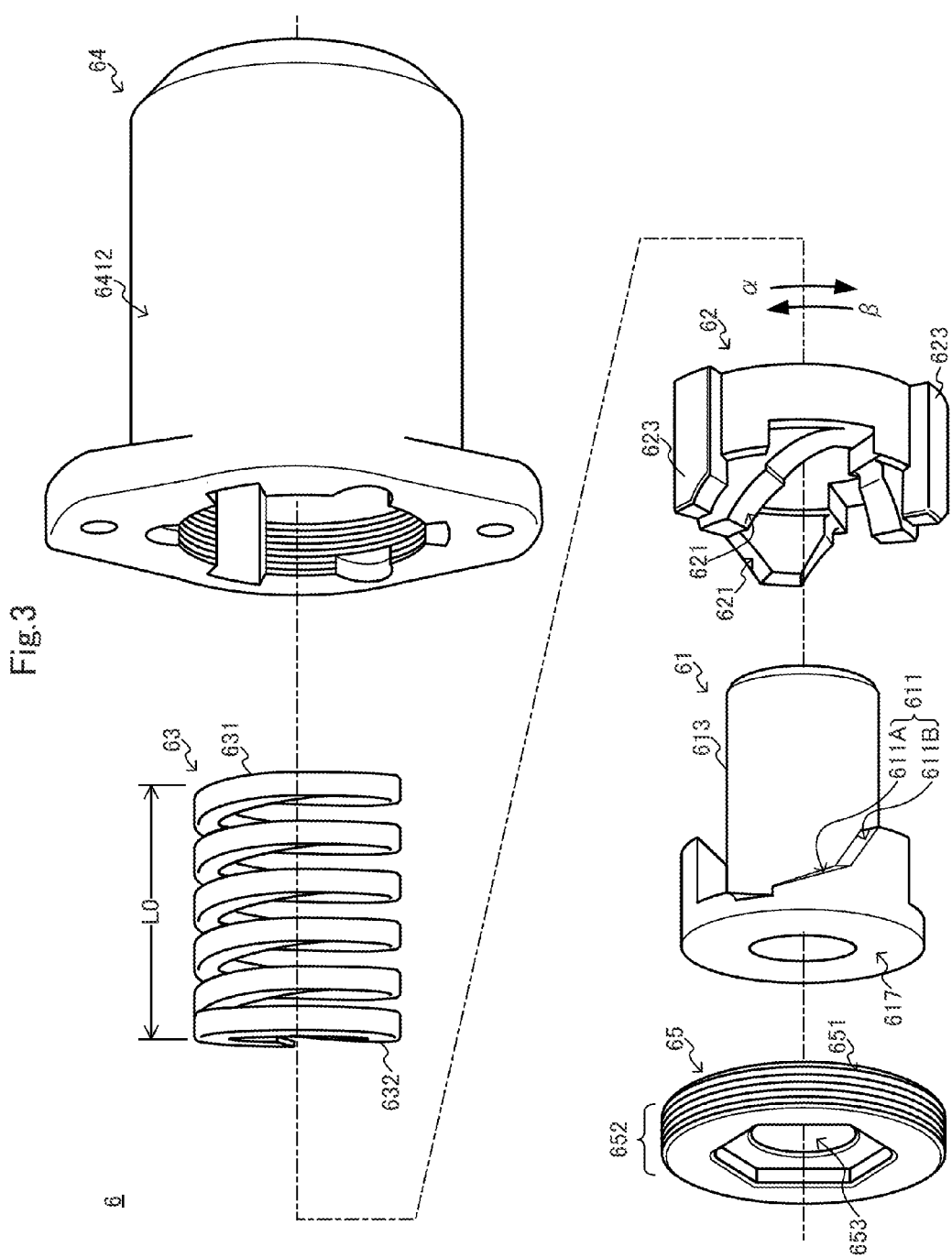
FIG. 3 is an exploded view of a damper 6 according to the first embodiment of the present invention.
Figure 4:
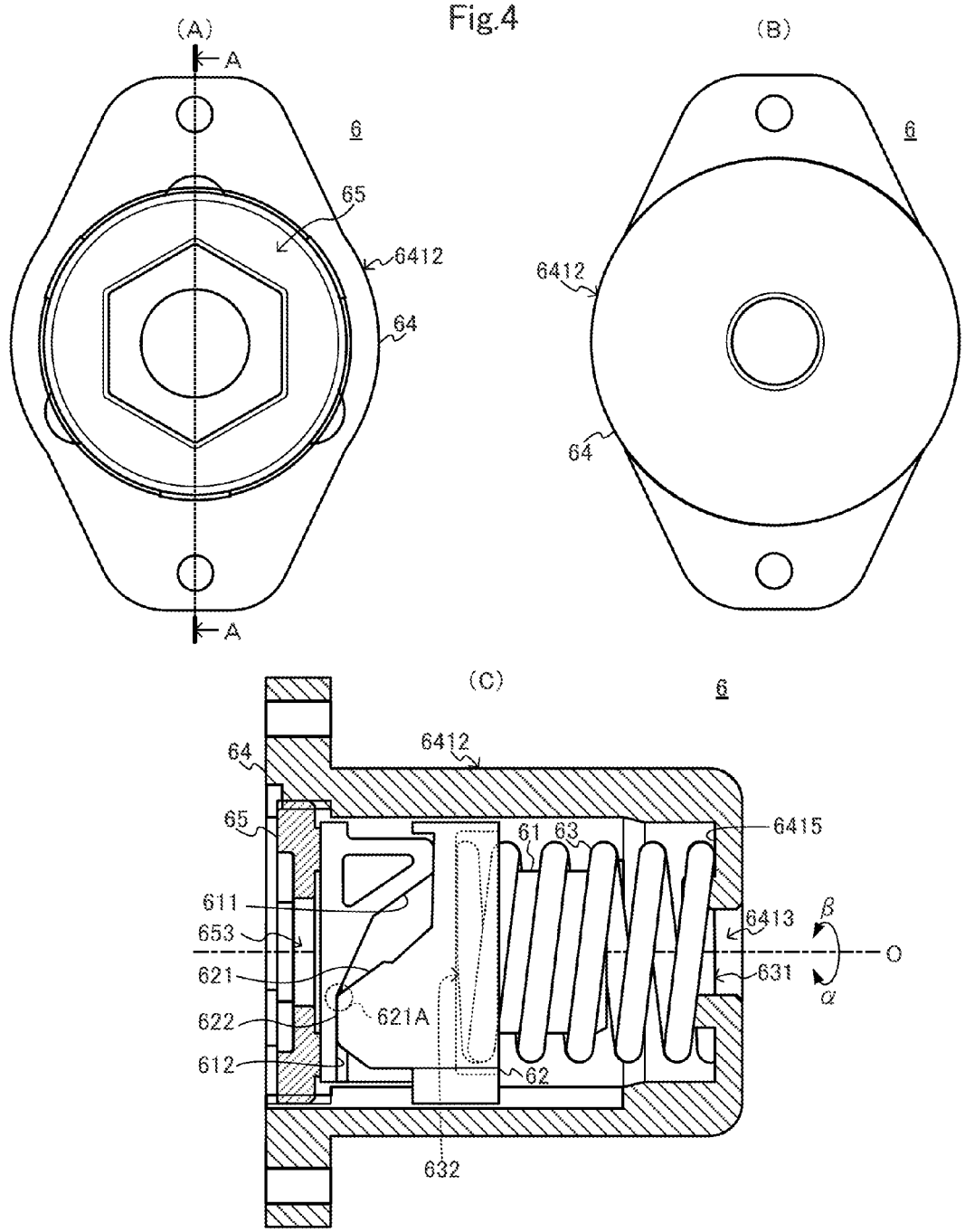
FIGS. 4(A) and 4(B) are left and right side views of the damper 6 in an initial state (with an accelerator pedal 21 being non-pressed), and FIG. 4(C) an A-A cross-section of FIG. 4(A)

FIG. 3 is an exploded view of the damper 6 according to the present embodiment. Further, FIGS. 4(A) and 4(B) are left and right side views of the damper 6 in an initial state (a state in which the accelerator pedal 21 is not pressed), and FIG. 4(C) an A-A cross-section of FIG. 4(A).

As illustrated in the figures, the damper 6 comprises: a pair of cams (the rotating cam 61 and a slide cam 62), whose rotation relative to each other about the axis O causes their inclined cam faces 611 and 621 to slide on and in contact with each other; a coil spring 63, which biases the slide cam 62 in the direction of pressing the each inclined cam face 621 of the slide cam 62 against the corresponding inclined cam face 611 of the rotating cam 61; the case 64, which houses these component parts 61-63 and is fixed to the other side plate 53 of the pedal bracket 5; and a disk-shaped cover 65, which seals the case 64.

Inside the case 64 sealed by the cover 65, the rotating cam 61 and the slide cam 62 are fitted in each other so that their inclined cam faces 611 and 621 engage with each other in accordance with the rotation relative between the rotating cam 61 and the slide cam 62 about the common axis O. The coil spring 63 is placed between a bottom face 62711 of a spring guide hole 6271 formed in the slide cam 62 and a bottom face 6415 of the case 64 so that the cam face 622 of the slide cam 62 are pressed against the cam face 612 of the rotating cam 61. In the initial state of the damper 6, the coil spring 63 has been preloaded, and owing to biasing by this coil spring 63, each inclined cam faces 621 of the slide cam 62 is located at a prescribed position (initial position) relative to the corresponding inclined cam face 611 of the rotating cam 61. Although details will be described later, each inclined cam face 611 of the rotating cam 61 includes two successive areas having different inclination angles with respect to a pitch circle 615 centering at the axis O (i.e. a first inclined area 611A and a second inclined area 611B having a larger inclination angle than that of the first inclined area 611A, mentioned in order from the side of the initial position of the inclined cam face 621 of the slide cam 62) (See FIG. 7(E)).

In the above-described structure, when the rotating cam 61 is rotated in the normal rotation direction α relative to the slide cam 62 while constraining rotational movement of the slide cam 62 relative to the case 64, then the slide cam 62 moves in the direction of getting away from the rotating cam 61 along a cam guide portion 613 of the rotating cam 61 while the inclined cam faces 621 slide on the corresponding inclined cam faces 611 of the rotating cam 61.

Here, until the rotating cam 61 rotates to the prescribed angle θ1 in the normal rotation direction α relative to the slide cam 62, each inclined cam face 621 of the slide cam 62 slides on the first inclined area 611A while only an edge portion 621A of the inclined cam face 621 is in contact with the first inclined area 611A in the inclined cam face 611 of the rotating cam 61. During this, the distance between the bottom face of the slide cam 62 and the bottom face 6415 of the case 64 becomes gradually smaller, and therefore the coil spring 63 is further compressed. As a result, the coil spring 63 presses more strongly the inclined cam faces 621 of the slide cam 62 against the first inclined areas 611A in the inclined cam faces 611 of the rotating cam 61, and presses more strongly the bottom face 617 of the rotating cam 61 against the cover 65 (the below-mentioned seating face 657; See FIG. 6). Accordingly, with increase of the angle of rotation of the rotating cam 61 in the normal rotation direction α relative to the slide cam 62, friction resistance, for example, between the inclined cam faces 621 of the slide cam 62 and the inclined cam faces 611 of the rotating cam 61 and between the bottom face 617 of the rotating cam 61 and the seating face 657 of the cover 65 increases gradually, and the torque of the rotating cam 61 in the rotation direction about the axis O increases gradually.

When the rotating cam 61 is further rotated in the normal rotation direction α relative to the slide cam 62, the whole area of each inclined cam face 621 of the slide cam 62 comes in contact with the second inclined area 611B (which is steeper than the first inclined area 611A with respect to the rotation direction of the pedal pivot pin 4 and the rotating cam 61) at the time when the rotating cam 61 rotates to the prescribed angle θ1 in the normal rotation direction α, and the inclined cam face 621 slides on the second inclined area 611A. As a result, at the time when the rotating cam 61 rotates to the prescribed angle θ1 in the normal rotation direction α, the slide cam 62 exerts greater force in the direction of resisting rotation of the rotating cam 61 in comparison with the case where the inclined cam face 621 slides on the first inclined area 611A of the gentle slope, and therefore the torque of the rotating cam 61 in the rotation direction about the axis O increases rapidly. The coil spring 63 is further compressed, and the inclined cam faces 621 of the slide cam 62 are pressed more strongly against the second inclined areas 611B in the inclined cam faces 611 of the rotating cam 61, and the bottom face 617 of the rotating cam 61 is pressed more strongly against the seating face 657 of the cover 65. Accordingly, with increase of the angle of rotation of the rotating cam 61 in the direction α relative to the slide cam 62, the friction resistance, for example, between the inclined cam faces 621 of the slide cam 62 and the inclined cam faces 611 of the rotating cam 61 and between the bottom face 617 of the rotating cam 61 and the seating face 657 of the cover 65 increases gradually, and the torque of the rotating cam 61 in the rotation direction about the axis O increases gradually.

During this, when the rotation of the rotating cam 61 is once stopped at any point in time, the inclined cam faces 621 of the slide cam 62 come to rest on the inclined cam faces 611 of the rotating cam 61. At that time, friction resistance is produced in the direction of resisting the tendency of the coil spring 63 toward elongation, and the torque of the rotating cam 61 in the rotation direction about the axis O decreases rapidly.

Further, when the rotating cam 61 is rotated in the reverse rotation direction β, the slide cam 62 moves in the direction of getting close to the rotating cam 61 along the cam guide portion 613 of the rotating cam 61 while the inclined cam faces 621 slide on the inclined cam faces 611 of the rotating cam 61. As a result, the distance between the bottom face of the slide cam 62 and the bottom face 6415 of the case 64 becomes gradually greater. And thus the coil spring 63 gradually returns (elongates) to the initial preload state, and the friction resistance, for example, between the inclined cam faces 621 of the slide cam 62 and the inclined cam faces 611 of the rotating cam 61 decreases gradually. Accordingly, with decrease of the rotation angle of the rotating cam 61 in the normal rotation direction α, the torque of the rotating cam 61 in the rotation direction about the axis O decreases gradually.

The above-described damper 6 has hysteresis characteristics suitable to use as a hysteresis generation mechanism (hys-unit) that applies a suitable load at the time of pressing the accelerator pedal 21 and reduces load while the accelerator pedal 21 is held at a certain position. When the damper 6 is assembled in the accelerator pedal unit 1, the damper 6 can not only realize natural accelerator pedal operation feeling while generating natural acceleration force, but also generate a rapid change in operational feeling of pressing the accelerator pedal 21, which can be detected as a signal for energy-saving driving of an automobile, at the time when the accelerator pedal 21 is pressed excessively. Each of the component parts 61-65 of the damper 6 realizing such functions will be described.

Figure 5:
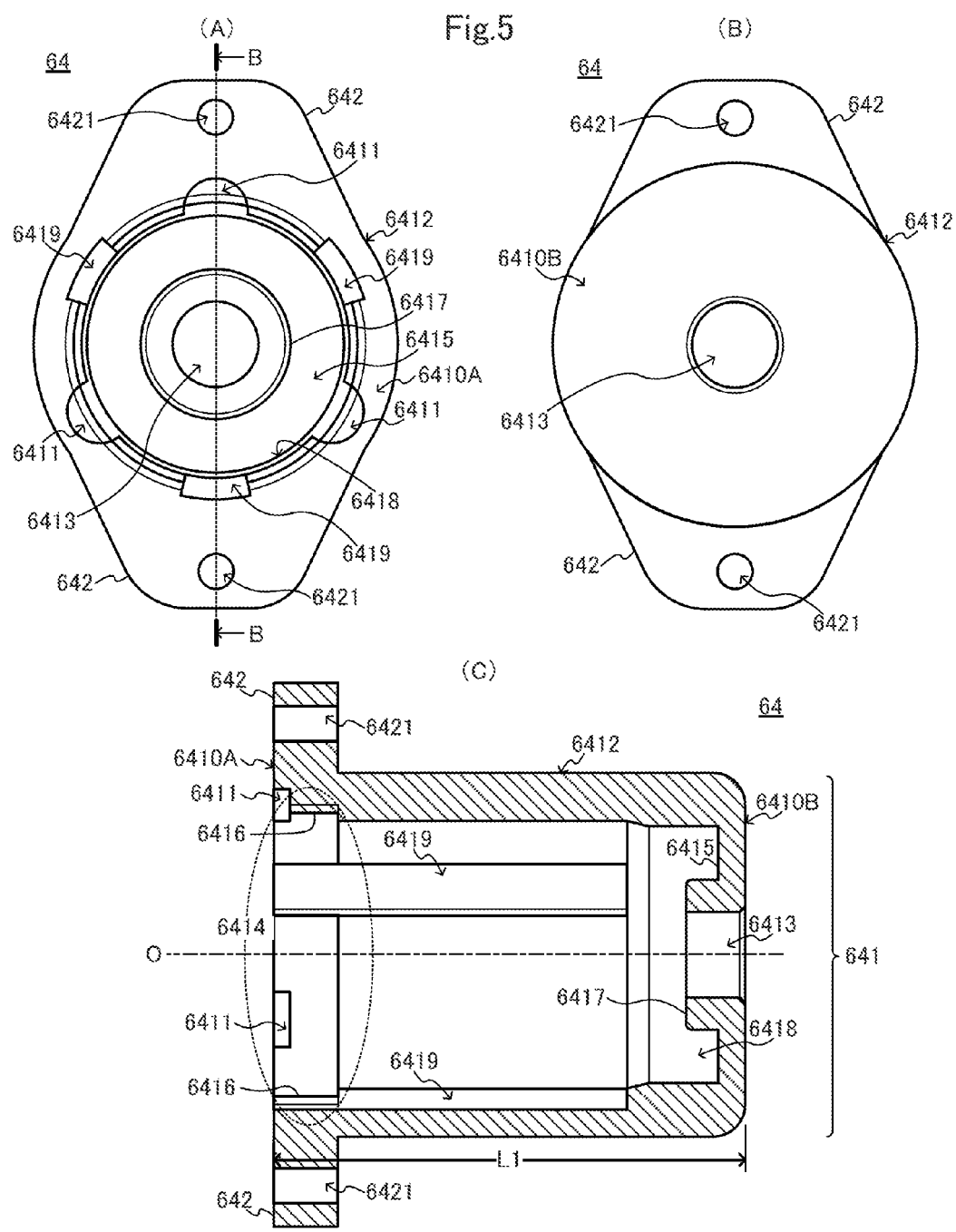
FIGS. 5(A) and 5(B) are left and right side views of a case 64, and FIG. 5(C) a B-B cross-section of FIG. 5(A)

FIGS. 5(A) and 5(B) are left and right side views of the case 64, and FIG. 5(C) a B-B cross-section.

As illustrated, the case 64 integrally comprises: a case body 641 of a bottomed cylindrical shape; and the two flange portions 642 projecting in radial directions from the outer periphery 6412 of the case body 641.

The cover 65 is fitted in an opening 6414 of the case body 641. In the inner periphery of the opening 6414, is formed a threaded portion 6416 into which a threaded portion 652 of the outer periphery 651 of the cover 65 is screwed. By tightening of this threaded portion 6416 and the threaded portion 652 in the outer periphery 651 of the cover 65, the cover 65 is fitted in the opening 6414 of the case body 641 while preloading the coil spring 63 housed in the case body 641. In an edge portion of the case body 641, a plurality of recessed portions 6411 for welding, which are used for fixing the cover 65 fitted in the opening 6414, are formed at almost regular angular intervals about the axis O of the case body 641.

In the central area of the bottom face 6415 of the case body 641, are formed a through-hole 6413 through which the axis O of the case body 641 passes, and a ring-shaped spring guide portion 6417 surrounding the outer circumference of the through-hole 6413. The spring guide portion 6417 is set into the coil spring 63 inserted in the case body 641, and fixes the position of one end 631 of the coil spring 63.

Further, in the inner periphery 6418 of the case body 641, are formed three grooves 6419 along the direction of the axis O of the case body 641 at almost regular angular intervals about the axis O of the case body 641. One end of each groove 6419 passes through the end face 6410A of the case body 641 on the opening side. When the slide cam 62 is inserted through the opening 6414 of the case body 641, projecting portions 623 on the outer periphery 624 of the slide cam 62 are slidably inserted into these grooves 6419. By this, rotational movement of the slide cam 62 relative to the case 64 is constrained. In other words, rotational movement of the slide cam 62 relative to the pedal bracket 5 is constrained.

Although, in the present embodiment, the three grooves 6419 are formed in the inner periphery 6418 of the case body 641 at almost regular angular interval about the axis O, the number and layout of the grooves 6419 are determined in accordance with the number and layout of the projecting portions 623 of the slide cam 62 that is used.

On the other hand, the two flange portions 642 are formed integrally with the outer periphery 6412 of the case body 641 so as to project outward from both sides of the opening-side end face 6410A of the case body 641. In these flange portions 642, are formed the bolt insertion holes 6421 for inserting the bolts 8 at positions that correspond to the respective bolt insertion holes in the other side plate 53 of the pedal bracket 5 when a through-hole 653 formed in the central area of the cover 65 fitted in the opening 6414 of the case body 641 is aligned with the pin insertion hole 531 of the other side plate 53 of the pedal bracket 5.

FIGS. 6(A) and 6(B) are a front view and a back view of the cover 65, and FIG. 6(C) a C-C cross-section of FIG. 6(A).

As illustrated, in the outer periphery 651 of the cover 65, is formed the threaded portion 652 that is screwed into the threaded portion 6416 formed in the opening 6414 of the case body 641. In one surface (the surface to be faced toward the outside of the case body 641) 654 of the cover 65, is formed a hexagon socket 656 for inserting a tool for rotating the cover 65 relative to the case body 641. On the other surface (the rear surface to be faced toward the inside of the case body 641) 655 of the cover 65, is formed a seating face 657 on which the bottom face 617 of the rotating cam 61 moves frictionally in the course of rotation. By rotating the tool inserted in the hexagon socket 656 in the surface 654 of the cover 65, the threaded portion 652 formed in the outer periphery 651 of the cover 65 is screwed in the threaded portion 6416 formed in the opening 6414 of the case body 641, and thereby the bottom face 617 of the rotating cam 61 is pressed by the seating face 657 of the cover 65. As a result, the rotating cam 61 and the slide cam 62 are pressed into initial positions within the case body 641, and the coil spring 63 is preloaded between the bottom face 6415 of the case body 641 and the bottom face 62711 (See FIG. 8(D)) of the spring guide hole 6271.

Further, in the central area of the cover 65, is formed the through-hole 653 having the inner diameter R2 larger than the outer diameter R1 of the damper connecting section 42 of the pedal pivot pin 4. In an assembled state of the damper 6, the axis O of the case body 641 passes through the through-hole 653, the inside of the rotating cam 61, and the through-hole 6413 of the bottom face 6415 of the case body 641 (See FIG. 4(C)). The pedal pivot pin 4 is inserted, first the side of the support section 41, into the through-hole 653, and passes through the inside of the rotating cam 61, so as to protrude from the through-hole 6413 of the bottom face 6415 of the case body 641.

Figure 7:
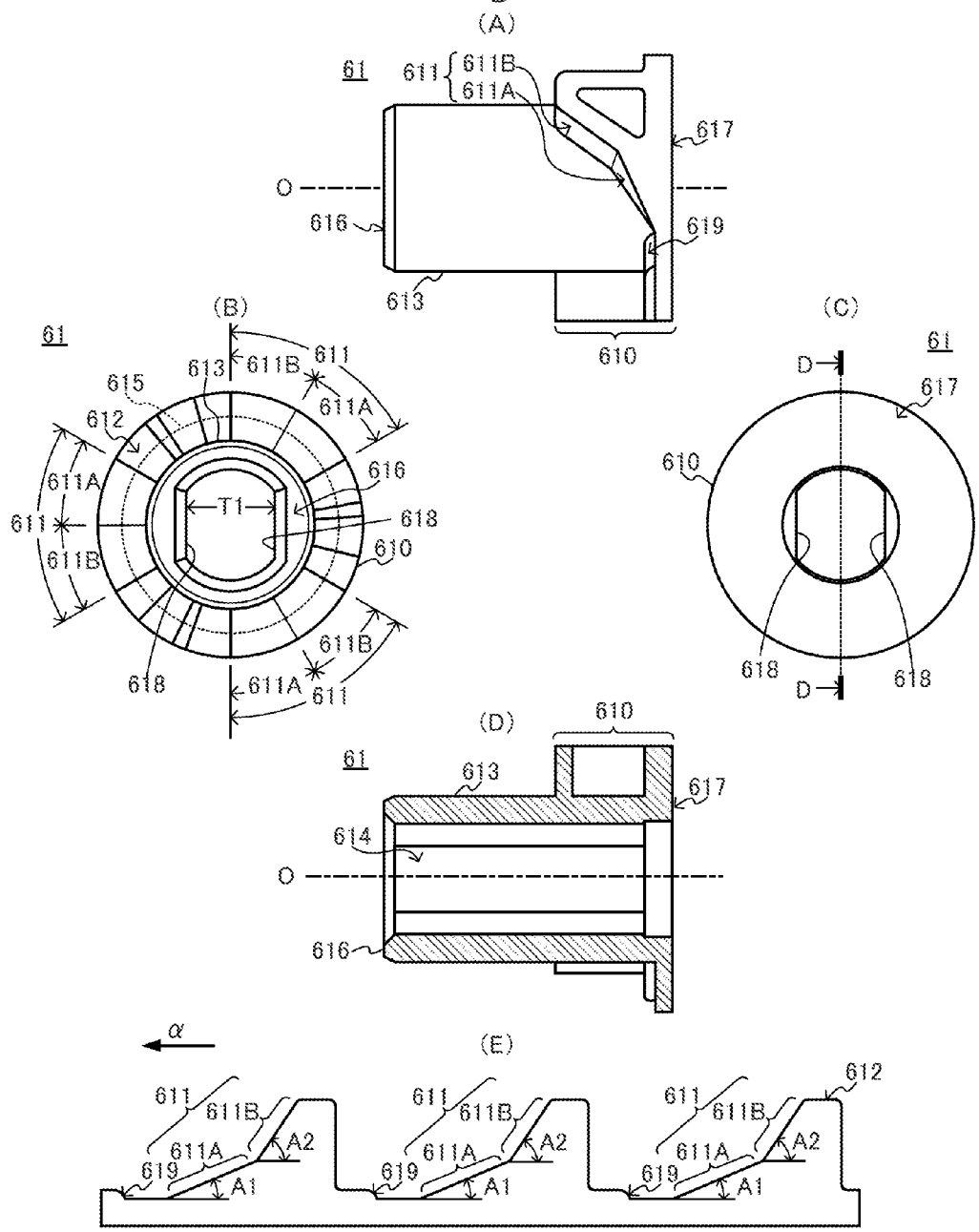
FIGS. 7(A), 7(B) and 7(C) are a front view and left and right side views of a rotating cam 61, FIG. 7(D) a D-D cross-section of FIG. 7(C), and FIG. 7(E) a view illustrating schematically a profile shape of a cam face 612 on a pitch circle 615 centering at an axis O.

FIGS. 7(A), 7(B) and 7(C) are a front view and left and right side views of the rotating cam 61, FIG. 7(D) a D-D cross-section of FIG. 7(C), and FIG. 7(E) a view illustrating schematically a profile shape of the cam face 612 on the pitch circle 615 centering at the axis O.

As illustrated, the rotating cam 61 has a stepped cylindrical shape including the cam guide portion 613 as a small-diameter portion and a cam portion 610 as a large-diameter portion that are integrally formed. The cam guide portion 613 is an inner-diameter guide for the slide cam 62 and inserted into the inside of the slide cam 62. On the other hand, the cam portion 610 has the cam face 612 on which the inclined cam faces 621 of the slide cam 62 slide.

Into the inside of the rotating cam 61, the pedal pivot pin 4 is inserted from one end face 616 toward the other end face (bottom face 617) after passing through the through-hole 653 of the cover 65. In an inner wall 614 of the rotating cam 61, are formed two flat surfaces 618 facing each other at a width-across-flat T1 corresponding to the width-across-flat t1 of the damper connecting section 42 of the pedal pivot pin 4. When the damper connecting section 42 of the pedal pivot pin 4 is inserted into the inside of the rotating cam 61, these flat surfaces 618 come in contact with the corresponding flat surfaces 423 of the damper connecting section 42 of the pedal pivot pin 4, so that the torque of the pedal pivot pin 4 is transmitted to the rotating cam 61. As a result, associated with rotation of the pedal pivot pin 4 in both directions α and β caused by operation of the accelerator pedal 21, the rotating cam 61 also rotates in both directions α and β about the axis O while generating friction resistance, for example, between the inclined cam faces 611 formed in the cam face 612 and the inclined cam faces 621 of the slide cam 62.

On the pitch circle 615 centering at the axis O, the cam face 612 (the face on the side of the cam guide portion 613) of the cam portion 610 periodically repeats concave forms and convex forms in the direction of the axis O. In detail, in the cam face 612 of the cam portion 610, three inclined cam faces 611 inclined to the circumferential direction of the pitch circle 615 (the rotation direction of the pedal pivot pin 4 and the like) are formed at almost regular angular intervals about the axis O. Further, between each pair of adjacent inclined cam faces 611, is formed a step face 619 for determining the initial position of an inclined cam face 621 of the slide cam 62.

In each inclined cam face 611, the two inclined areas 611A and 611B, whose inclination angles with respect to the circumferential direction of the pitch circle 615 (i.e. inclination angles with respect to the rotation direction of the pedal pivot pin 4 and the like) are different from each other, are formed successively in the direction of the rotation of the pedal pivot pin 4 and the like. In detail, each inclined cam face 611 includes the first inclined area 611A inclined at a prescribed angle A1 with respect to the circumferential direction of the pitch circle 615 and the second inclined area 611B inclined at an angle A2 larger than the inclination angle A1 of the first inclined area 611A with respect to the circumferential direction of the pitch circle 615, being arranged in this order from the side of the corresponding step face 619 backward in the normal rotation direction α of the rotating cam 61. Accordingly, when the rotating cam 61 rotates in the normal rotation direction α interlocking with the pedal pivot pin 4, each inclined face 621 of the slide cam 62 starts rotational movement relative to the cam face 612 of the rotating cam 61. First, the inclined cam face 621 goes sliding on the first inclined area 611A of the gentle slope from the initial position determined by the corresponding step face 619 toward the second inclined area 611B. Thereafter, at the time when the rotating cam 61 rotates to the prescribed angle θ1 in the normal rotation direction α, the inclined cam face 621 comes on the second inclined area 611B that is steeper than the first inclined area 611A, and slides on this second inclined area 611B.

Figure 8:
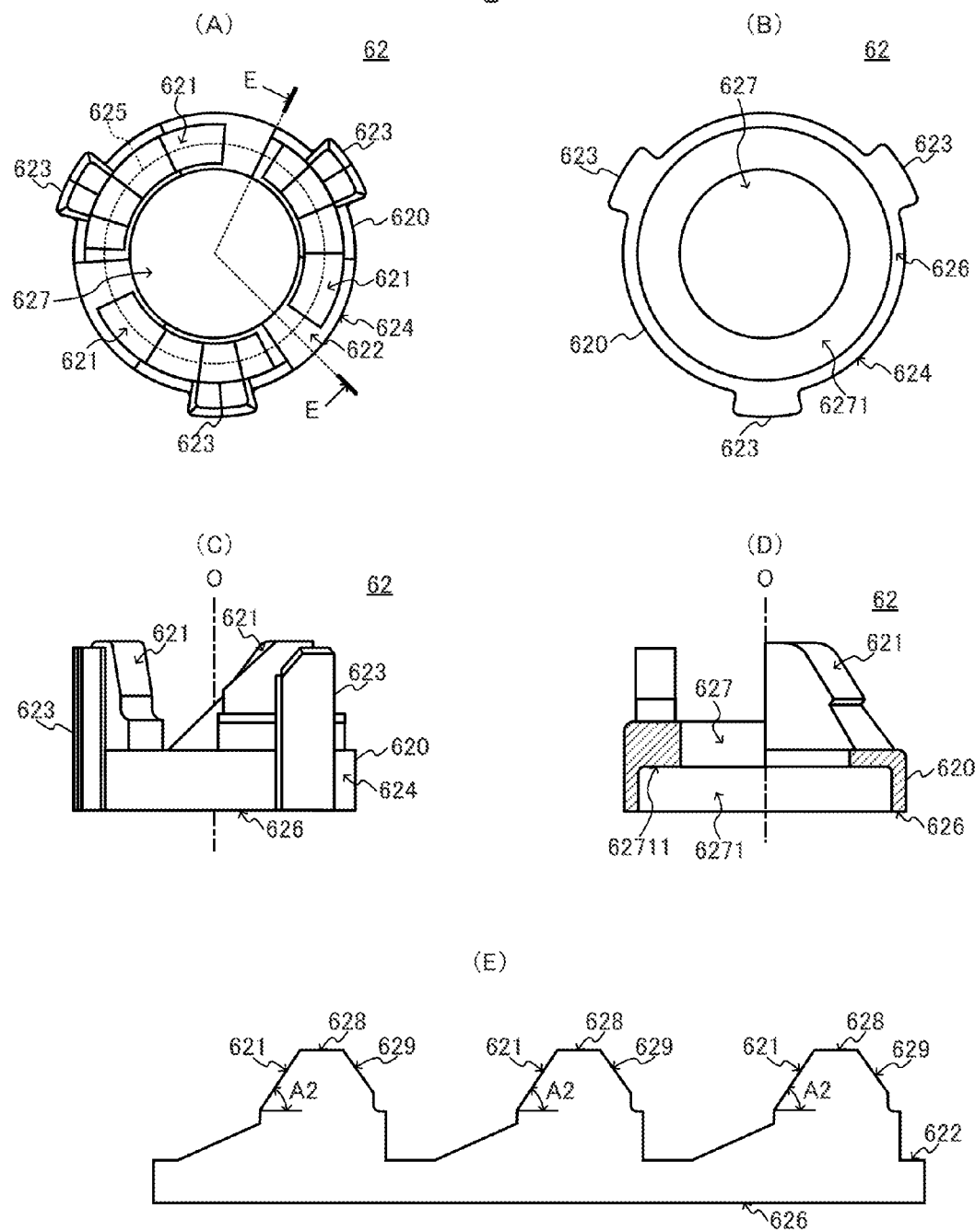
FIGS. 8(A), 8(B) and 8(C) are a front view, a back view and a side view of a slide cam 62, FIG. 8(D) an E-E cross-section of FIG. 8(A), and FIG. 8(E) a view illustrating schematically a profile shape of a cam face 622 on a pitch circle 625 centering at the axis O.

FIGS. 8(A), 8(B) and 8(C) are a front view, a back view and a side view of the slide cam 62, FIG. 8(D) an E-E cross-section of FIG. 8(A), and FIG. 8(E) a view illustrating schematically a profile shape of the cam face 622 on the pitch circle 625 centering at the axis O.

The slide cam 62 comprises: a cylindrical cam portion 620, into which the cam guide portion 613 of the rotating cam 61 is slidably inserted; and projecting portions 623 formed on the outer periphery 624 of the cam portion 620 along the axis O of the cam portion 620.

In the inner periphery of the cam portion 620, is formed a stepped hole 627 having a spring guide hole 6271 as a large-diameter portion on the side of a bottom face 626 of the cam guide portion 620. This spring guide hole 6271 is used for receiving the one end 631 of the coil spring 63.

The cam face (the end face opposite to the bottom face 626) 622 of the cam portion 620 periodically repeats concave forms and convex forms in the direction of the axis O on the pitch circle 625 centering at the axis O. In detail, in the cam face 622 of the cam portion 620, three inclined cam faces 621 inclined at nearly the same angle A2 as that of the second inclined areas 611B of the rotating cam 61 to the circumferential direction of the pitch circle 625 (the rotation direction of the pedal pivot pin 4 and the like) are formed at almost regular angular intervals about the axis O. Further, for each inclined cam face 621, are formed a flat face 628, which follows the inclined cam face 621, and an inclined face 629 that comes in contact with a step face 619 in the cam face 612 of the rotating cam 61.

When the cam guide portion 613 of the rotating cam 61 is inserted into the inside of the cam portion 620 in a state that the cam face 622 of the cam portion 620 is faced toward the cam face 612 of the rotating cam 61, the cam guide portion 613 of the rotating cam 61 protrudes from the side of the bottom face 626 of the cam portion 620. The cam guide portion 613 protruding from the side of the bottom face 626 of the cam portion 620 is inserted into the coil spring 63, and the spring guide hole 6271 of the cam portion 620 is made to enclose the one end 631 of the coil spring 63. The coil spring 63, the slide cam 62 and the rotating cam 61, which are assembled in the above way, are housed, first the side of the other end 632 of the coil spring 63, into the case body 641 through the opening 6414 of the case body 641, after the projecting portions 623 of the slide cam 62 are aligned with the grooves 6419 of the case body 641.

The free length L0 of the coil spring 63 is greater than the distance between the bottom face 6415 of the case body 641 and the bottom face 62711 of the spring guide hole 6271 of the slide cam 62 in the initial state of the damper 6. Accordingly, when the cover 65 is screwed in the opening 6414 of the case body 641, the coil spring 63 is preloaded between the bottom face 6415 of the case body 641 and the bottom face 62711 of the spring guide hole 6271 of the slide cam 62. As a result, the slide cam 62 is biased toward the direction of pressing the inclined cam faces 621 of the slide cam 62 against the inclined cam faces 611 of the rotating cam 61. This causes rotation of the rotating cam 61, and thereby the inclined faces 629 in the cam face 622 of the slide cam 62 come in contact with the respective step faces 619 in the cam face 612 of the rotating cam 61. This position becomes the initial position of the inclined cam faces 621 of the slide cam 62 relative to the inclined cam faces 611 of the rotating cam 61.

Within the case body 641, the one end 631 of the coil spring 63 is in contact with the bottom face 62711 of the spring guide hole 6271 of the slide cam 62, and the other end 632 is in contact with the bottom face 6415 of the case body 641 (See FIG. 4(C)). Thus, it is favorable that both ends 631 and 632 of the coil spring 63 are polishing-processed closed ends so that both ends 631 and 632 of the coil spring 63 are stable in this state.

Owing to the above-described construction, the accelerator pedal unit 1 of the present embodiment makes it possible that a suitable load is applied on a driver's foot during pressing of the accelerator pedal 21 down and the load applied on the driver's foot becomes rapidly larger by enough magnitude to be detected by tactile sensation at the time when the accelerator pedal 21 is pressed to the position where the energy expenditure rate of the automobile deteriorates to the prescribed level (i.e. when the pedal pivot pin 4 rotates to the prescribed angle θ1 in the normal rotation direction α). This will be described in the following.

FIGS. 9(A), 9(B) and 9(C) are views for explaining two-stage damping motion of the damper 6 associated with pressing the accelerator pedal 21.

As illustrated in FIG. 9(A), in the state where the accelerator pedal 21 is not pressed, each inclined cam face 621 of the slide cam 62 of the damper 6 is located in the initial position determined by the corresponding step face 619 of the cam face 612 of the rotating cam 61.

As illustrated in FIG. 9(B), when the accelerator pedal 21 is pressed, the pedal pivot pin 4 rotates in the normal rotation direction α interlocking with swinging of the accelerator pedal arm 2. At that time, within the damper 6, the flat surfaces 423 of the damper connecting section 42 of the pedal pivot pin 4 come in contact with the respective opposed flat surfaces 618 in the inner wall of the rotating cam 61, so that the rotating cam 61 is rotated in the normal rotation direction α. As a result, the slide cam 62 moves in the direction A of getting away from the rotating cam 61 while only the edge portion 621A of each inclined cam face 621 is in sliding contact with the first inclined area 611A of the gentle slope in the corresponding inclined cam face 611 of the rotating cam 61 until the rotating cam 61 rotates to the prescribed angle θ1 in the normal rotation direction α. During this, the coil spring 63 is gradually compressed from the initial preloaded state, so that the coil spring 63 presses more and more strongly the edge portion 621A of each inclined cam face 621 of the slide cam 62 against the first inclined area 611A of the corresponding inclined cam face 611 of the rotating cam 61. Accordingly, the friction resistance, for example, between the edge portion 621A of the inclined cam face 621 of the slide cam 62 and the first inclined area 611A in the inclined cam face 611 of the rotating cam 61 gradually increases, and the torque of the rotating cam 61 in the rotation direction about the axis O increases gradually with increase of the angle of rotation of the rotating cam 61 in the normal rotation direction α relative to the slide cam 62. As a result, rotation of the pedal pivot pin 4 in the normal rotation direction α is damped, and the suitable load is applied on the driver's foot that presses the accelerator pedal 21.

As illustrated in FIG. 9(C), when the accelerator pedal 21 is pressed to the position where the energy expenditure rate of the automobile deteriorates to the prescribed level (i.e. when the pedal pivot pin 4 rotates to the prescribed angle θ1 in the normal rotation direction α), then in each inclined cam face 611 of the rotating cam 61, the whole area of the corresponding inclined cam face 621 of the slide cam 62 comes in contact with the second inclined area 611B that is steeper than the first inclined area 611A with respect to the circumferential direction of the pitch circle 615 (the rotation direction of the pedal pivot pin 4 and the like). Accordingly, the slide cam 62 exerts greater force in the direction of resisting rotation of the rotating cam 61 in comparison with the case where the inclined cam faces 621 slide on the first inclined areas 611A of the gentle slope, and the torque of the rotating cam 61 in the rotation direction about the axis O increases rapidly. As a result, at the time when the accelerator pedal 21 is pressed to the position where the energy expenditure rate of the automobile deteriorates to the prescribed level, the load applied on the driver's foot that presses the accelerator pedal 21 increases rapidly by at least magnitude such that a variation of load can be detected by tactile sensation.

When the driver continues pressing down the accelerator pedal 21 furthermore (i.e. when the pedal pivot pin 4 rotates over the prescribed angle θ1 in the normal rotation direction α), then in each inclined cam face 611 of the rotating cam 61, the corresponding inclined cam face 621 of the slide cam 62 goes on the second inclined area 611B that is steeper than the first inclined area 611A with respect to the circumferential direction of the pitch circle 615 (the rotation direction of the pedal pivot pin 4 and the like), and is in sliding contact with the second inclined area 611B. During this, the coil spring 63 is further compressed, and presses further strongly the inclined cam faces 621 of the slide cam 62 against the second inclined areas 611B of the inclined cam faces 611 of the rotating cam 61. Accordingly, with increase of the angle of rotation of the rotating cam 61 in the normal rotation direction α, the friction resistance, for example, between the inclined cam face 621 of the slide cam 62 and the inclined cam face 611 of the rotating cam 61 increases gradually, and the torque of the rotating cam 61 in the rotation direction about the axis O increases gradually. As a result, also after the rapid increase of the load applied on the driver's foot that presses the accelerator pedal 21, the load applied on the driver's foot that presses the accelerator pedal 21 further increases gradually as long as the driver continues pressing down the accelerator pedal 21. Accordingly, the driver can intuitively grasp the continuous worsening of the energy expenditure rate of the automobile through operation of pressing the accelerator pedal 21 without constantly caring about a change of visual information obtained from the meters on the instrument panel.

As describe hereinabove, according to the accelerator pedal unit 1 of the present embodiment, the pedal pivot pin 4, which is rotated by operation (i.e. pressing and releasing) of the accelerator pedal 21, is connected to the damper 6 that damps rotation of the pedal pivot pin 4, and at the time when the pedal pivot pin 4 rotates to the angle θ1, at which the energy expenditure rate of the automobile deteriorates to the prescribed level, in the normal rotation direction α, the force of the damper 6 for damping the rotation of the pedal pivot pin 4 increases rapidly. Accordingly, it is possible that a suitable load is applied on the driver's foot pressing down the accelerator pedal 21 and the load applied on the driver's foot becomes rapidly heavier by at least magnitude that can be detected by tactile sensation when the accelerator pedal 21 is pressed to the position where the energy expenditure rate of the automobile deteriorates to the prescribed level. Thus, the driver can detect a rapid change in operational feeling of pressing the accelerator pedal 21 as a signal for energy-saving driving of the automobile.

Further, when the driver continues pressing down the accelerator pedal 21 thereafter (i.e. when the pedal pivot pin 4 rotates over the prescribed angle θ1 in the normal rotation direction α), the coil spring 63 is further compressed, and the inclined cam faces 621 of the slide cam 62 are further strongly pressed against the second inclined areas 611B of the inclined cam faces 611 of the rotating cam 61. Accordingly, with increase of the angle of rotation of the rotating cam 61 in the normal rotation direction α, the friction resistance, for example, between the inclined cam faces 621 of the slide cam 62 and the inclined cam faces 611 of the rotating cam 61 increases furthermore, and the torque of the rotating cam 61 in the rotation direction about the axis O increases furthermore. Accordingly, the load applied on the driver's foot that presses down the accelerator pedal 21 further increases gradually even after the rapid increase of the load. Therefore, the driver can intuitively catch the continuous worsening of the energy expenditure rate of the automobile through operation of pressing the accelerator pedal 21.

In the present embodiment, each inclined cam face 611 of the rotating cam 61 includes the two inclined areas 611A and 611B whose inclination angles with respect to the rotation direction of the pedal pivot pin 4 and the like are different from each other. However, it is possible to form three or more inclined areas, whose inclination angles with respect to the rotation direction of the pedal pivot pin 4 and the like are different from one another, in each inclined cam face 611 of the rotating cam 61, so that the driver can detect change in the traveling state of the automobile in more-finely-divided stages.

Although, in the present embodiment, each inclined cam face 611 of the rotating cam 61 includes the two inclined areas 611A and 611B whose inclination angles with respect to the rotation direction of the pedal pivot pin 4 and the like are different from each other, each inclined cam face 621 of the slide cam 62 may include a plurality of inclined areas whose inclination angles with respect to the rotation direction of the pedal pivot pin 4 and the like are different from one another. Or, for both inclined cam faces 621 of the slide cam 62 and inclined cam faces 611 of the rotating cam 61, each inclined cam face may include two inclined areas (a first inclined area inclined at a prescribed angle A1 and a second inclined area inclined at an angle A2 larger than the inclination angle A1 of the first inclined area). Then, each inclined face 611 of the rotating cam 61 and the corresponding inclined face 621 of the slide cam 62 may be in sliding contact with each other at their first inclined areas of the gentle slope until the pedal pivot pin 4 rotates to the prescribed angle θ1, and then at their second inclined areas of the steeper slope when the pedal pivot pin 4 rotates over the prescribed angle θ1.

Further, the present embodiment uses the coil spring 63 for biasing the slide cam 62. However, another elastic body such as rubber, a spring other than the coil spring, or the like may be used.

Second Embodiment

In the above-described embodiment (First Embodiment), each inclined cam face of at least one of the rotating cam 61 and the slide cam 62 in the damper 6 includes a plurality of inclined areas whose inclination angles with respect to the rotation direction of the pedal pivot pin 4 and the like are different from one another. However, a damper used in an accelerator pedal unit can have other structure in which friction resistance impeding relative rotation of a rotating cam and a slide cam changes stepwise as the angle of the relative rotation of the rotating cam and the slide cam increases. For example, in the damper 6, it is possible to use an elastic member having non-linear characteristics, whose elastic coefficient increases stepwise as the rotation angle of the pivot pin 4 increases, so that the resistance force for damping the rotation of the pivot pin 4 increases rapidly at the time when the pivot pin 4 rotates to a prescribed rotation angle. In the following, this case (Second Embodiment) will be described.

First, structure of an accelerator pedal unit 11 according to the present embodiment and structure of a damper 16 used in the accelerator pedal unit 11 will be described. However, in the present embodiment, component parts similar to those in the first embodiment will be given the same reference signs as those in the first embodiment, and their detailed description will be omitted. Similarly to the accelerator pedal unit 1 of the first embodiment, the accelerator pedal unit 11 of the present embodiment comprises: an accelerator pedal arm 2; a pedal pivot pin 4; a pedal bracket 5; retaining ring 7; a spring 3; and a detection part including a potentiometer and the like (See FIG. 1).

Further, this accelerator pedal unit 11 also further comprises: a damper 16 in which resisting force for damping rotation of the pedal pivot pin 4 increases stepwise according to angle θ of rotation of the pedal pivot pin 4 in a normal rotation direction α; and bolts 8 and nuts 9 for fixing the damper 16 to the pedal bracket 5, in order that, while a suitable load is applied on a driver's foot that presses an accelerator pedal 21, the load applied on the driver's foot becomes rapidly heavier by at least magnitude that can be detected by tactile sensation at the time when the accelerator pedal 21 is pressed to a position where the energy expenditure rate of the automobile deteriorates to a prescribed level (or when the pedal pivot pin 4 rotates to a prescribed angle θ1 in the prescribed direction α about the axis O of the pedal pivot pin 4). However, construction of the damper 16 is different from the damper 6 of the first embodiment.

Similarly to the damper 6 of the first embodiment, the damper 16 is placed between two side plates 52 and 53, and fixed to the other side plate 53 by tightening nuts 9 on bolts 8 inserted through bolt insertion holes 6421 in flange portions 642 of a case 164 and bolt insertion holes in the other side plate 53. In this state, the pedal pivot pin 4 is inserted, first the side of a support section 41 of the pedal pivot pin 4, through a pin support hole 521 of the one side plate 52 until a groove 413 of the support section 41 comes out of a pin support hole 531 of the other side plate 53. As a result, the pedal pivot pin 4 is rotatably supported in the pin support holes 521 and 531 of the two side plates 52 and 53 at the two positions, i.e. at a support area 425 of a damper connecting section 42 and at the support section 41, in a state that two flat surfaces 423 of the damper connecting section 42 are contained in the damper 16 fixed to the other side plate 53. Then, a retaining ring 7 having an outer diameter larger than the pin support hole 531 of the other side plate 53 is fitted in the groove 413 of the support section 41, to prevent dropping of the pedal pivot pin 4 out of the pedal bracket 5.

Figure 10:
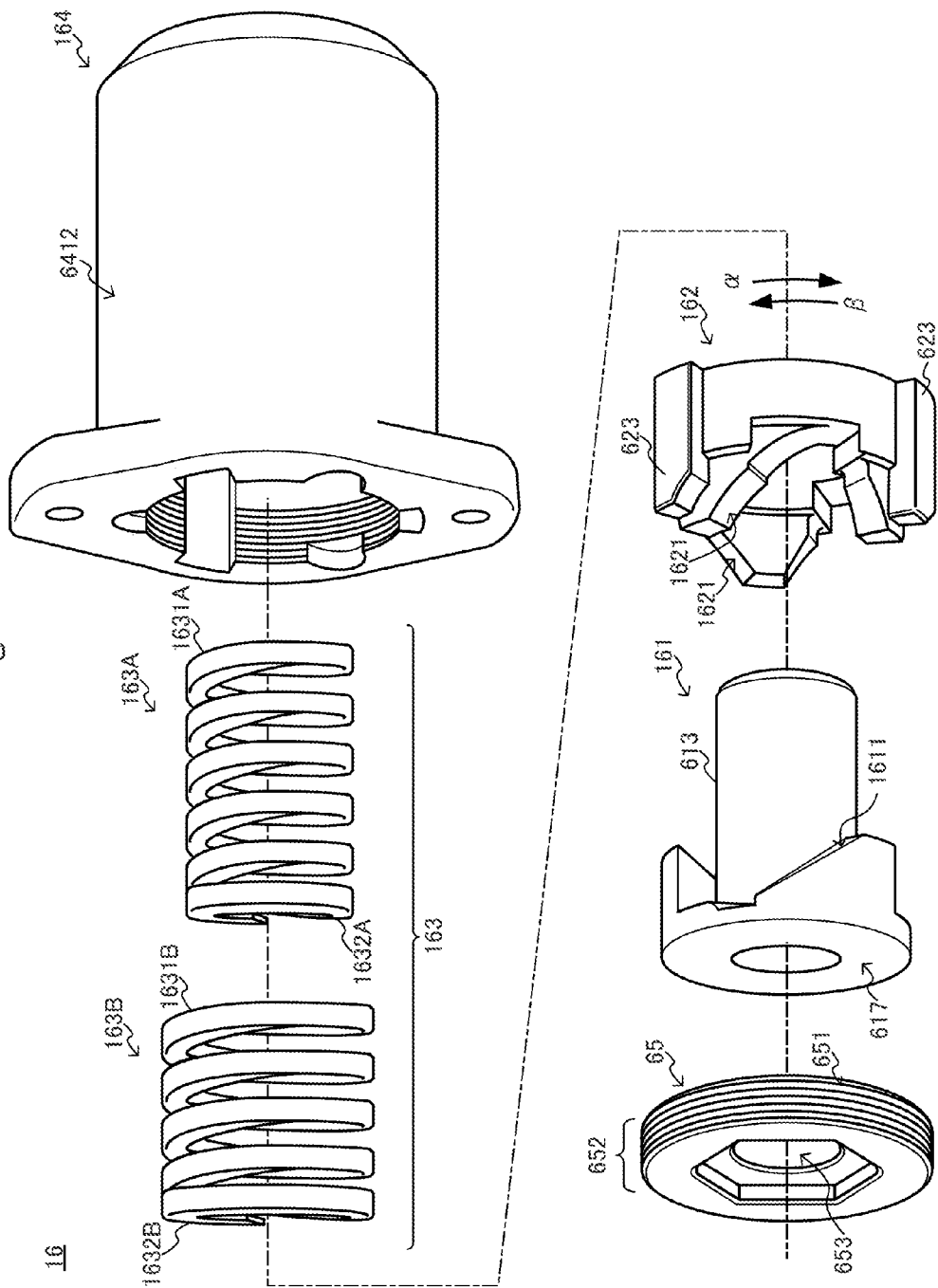
FIG. 10 is an exploded view of a damper 16 according to a second embodiment of the present invention.
Figure 11:
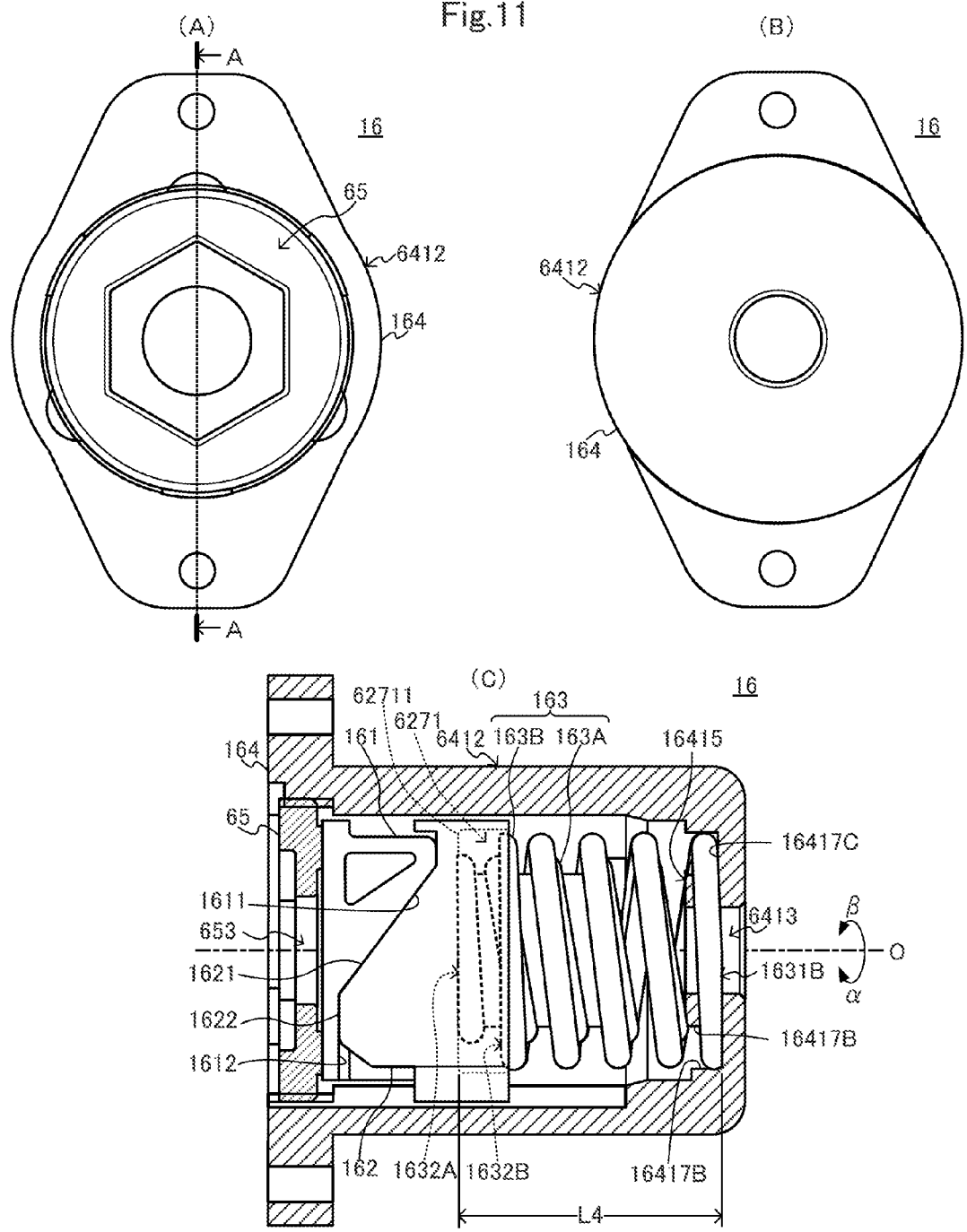
FIGS. 11(A) and 11(B) are left and right side views of the damper 16 in an initial state (with an accelerator pedal 21 being non-pressed), and FIG. 11(C) an A-A cross-section of FIG. 11(A)

FIG. 10 is an exploded view of the damper 16 according to the present embodiment. Further, FIGS. 11(A) and 11(B) are left and right side views of the damper 16 in an initial state (a state in which the accelerator pedal 21 is not pressed), and FIG. 11(C) an A-A cross-section of FIG. 11(A).

As illustrated, the damper 16 comprises: a pair of cams (a rotating cam 161 and a slide cam 162), whose rotation relative to each other about the axis O causes their inclined cam faces 1611 and 1621 to slide on and in contact with each other; a combination spring 163, which biases the slide cam 162 in the direction of pressing the each inclined cam face 1621 of the slide cam 162 against the corresponding inclined cam face 1611 of the rotating cam 161; the case 164, which houses these component parts 161-163 and is fixed to the other side plate 53 of the pedal bracket 5; and a disk-shaped cover 65, which seals the case 164.

Inside the case 164 sealed by the cover 65, the rotating cam 161 and the slide cam 162 are fitted in each other so that their inclined cam faces 1611 and 1621 engage with each other in accordance with the rotation relative between the rotating cam 161 and the slide cam 162 about the common axis O. Although details will be described later, the combination spring 163 is constructed by combining in a nested state two type of coil springs (a first coil spring 163A and a second coil spring 163B) having different diameters and different natural lengths from each other, so as to have non-linear spring characteristics in that the spring constant increases at the time when the compression amount reaches a prescribed value. This combination spring 163 is placed between a bottom face 62711 of a spring guide hole 6271 formed in the slide cam 162 and a groove bottom 16417C of a groove 16417 formed in the bottom portion 16415 of the case 164, so that a cam face 1622 of the slide cam 162 is pressed against a cam face 1612 of the rotating cam 161 by the restoring force of the combination spring 163. In the initial state of the damper 16, each inclined cam face 1621 of the slide cam 162 is located at a prescribed position (initial position) relative to the corresponding inclined cam face 1611 of the rotating cam 161, owing to biasing by the combination spring 163 preloaded (the first coil spring 163A preloaded).

In the above-described structure, when the rotating cam 161 is rotated in the normal rotation direction α relative to the slide cam 162 while constraining rotational movement of the slide cam 162 relative to the case 164, then the slide cam 162 moves in the direction of getting away from the rotating cam 161 (in the direction toward the bottom portion 16415 of the case 164) along a cam guide portion 613 of the rotating cam 161 while each inclined cam face 1621 slides on and in contact with the corresponding inclined cam face 1611 of the rotating cam 61. At this time, the distance between the bottom face 62711 of the spring guide hole 6271 of the slide cam 62 and the groove bottom 16417C of the groove 16417 in the bottom portion 16415 of the case 164 becomes gradually smaller, and therefore the combination spring 163 is further compressed. As a result, the combination spring 163 presses more strongly the inclined cam faces 1621 of the slide cam 162 against the inclined cam faces 1611 of the rotating cam 161, and presses more strongly a bottom face 617 of the rotating cam 161 against a seating face 657 (See FIG. 6) of the cover 65. Accordingly, with increase of the angle of rotation θ of the rotating cam 61 in the normal rotation direction α relative to the slide cam 162, friction resistance, for example, between the inclined cam faces 1621 of the slide cam 162 and the inclined cam faces 1611 of the rotating cam 161 and between the bottom face 167 of the rotating cam 161 and the seating face 657 of the cover 65 increases gradually, and the torque of the rotating cam 161 in the rotation direction about the axis O increases gradually.

When the rotating cam 161 is further rotated in the normal rotation direction α relative to the slide cam 162, the slide cam 162 further moves toward the bottom portion 16415 of the case 164 along the cam guide portion 613 of the rotating cam 161 while rotating relative to the rotating cam 161. As a result, the distance between the bottom face 62711 of the spring guide hole 6271 of the slide cam 162 and the groove bottom 16417C of the bottom portion 16415 of the case 164 becomes gradually smaller furthermore, and the combination spring 163 is further compressed. At the time when the rotating cam 161 rotates to the prescribed angle θ1 in the normal rotation direction α, the compression amount of the combination spring 163 reaches the prescribed value where the spring constant increases. Thus, at the time when the rotation cam 161 rotates to the prescribed angle θ1 in the normal direction α, the restoring force of the combination spring 163 increases rapidly by the magnitude corresponding to the increment of the spring constant. Accordingly, the friction resistance, for example, between the inclined cam faces 1621 of the slide cam 162 and the inclined cam faces 1611 of the rotating cam 161 and between the bottom face 617 of the rotating cam 161 and the bottom face 657 of the cover 65 increases rapidly. Thereby, the torque of the rotating cam 61 in the rotation direction about the axis O increases rapidly at the time when the rotating cam 161 rotates to the prescribed angle θ1 in the normal rotation direction α, and thereafter the torque increases gradually with increase of the rotation angle θ of the rotating cam 161 in the normal rotation direction α relative to the slide cam 162.

During this, when rotation of the rotating cam 161 is once stopped at any point in time, the inclined cam faces 1621 of the slide cam 162 come to rest on the inclined cam faces 1611 of the rotating cam 161. At that time, friction resistance is produced in the direction of resisting the tendency of the combination spring 163 toward elongation, and the torque of the rotating cam 161 in the rotating direction about the axis O decreases rapidly.

Further, when the rotating cam 161 is rotated in the reverse rotation direction β, the slide cam 162 moves in the direction of getting close to the rotating cam 161 along the cam guide portion 613 of the rotating cam 161 while the inclined cam faces 1621 slide on the inclined cam faces 1611 of the rotating cam 161. As a result, the distance between the bottom face 62711 of the spring guide hole 6271 of the slide cam 162 and the groove bottom 16417C in the bottom portion 16415 of the case 164 becomes gradually greater. And thus the combination spring 163 returns (elongates) to the initial state, and the friction resistance, for example, between the inclined cam faces 1621 of the slide cam 162 and the inclined cam faces 1611 of the rotating cam 161 decreases gradually. Accordingly, with decrease of the rotation angle θ of the rotating cam 161 in the normal rotation direction α, the torque of the rotating cam 161 in the rotation direction about the axis O decreases gradually.

The above-described damper 16 has hysteresis characteristics suitable to use as a hysteresis generation mechanism (hys-unit) that applies a suitable load at the time of pressing the accelerator pedal 21 and reduces load while the accelerator pedal 21 is held at a certain position. When the damper 16 is assembled in the accelerator pedal unit 11, the damper 16 can not only realize natural accelerator pedal operation feeling while generating natural acceleration force, but also generate a rapid change in operational feeling of pressing the accelerator pedal 21, which can be detected as a signal for energy-saving driving of an automobile, at the time when the accelerator pedal 21 is pressed excessively. Each of the component parts 161-164, 165 of the damper 16 realizing such functions will be described.

FIG. 12(A) is a view for explaining the structure of the combination spring 163. Further, FIG. 12(B) is a view illustrating a state of the combination spring 163 before increase of the spring constant, and FIG. 12(C) is a view illustrating a state of the combination spring 163 with the spring constant increased.

The combination spring 163 is constructed by combining in a nested state the two type of coil springs (the first coil spring 163A and the second coil spring 163B) having different diameters and different natural lengths from each other, so as to have the non-linear spring characteristics in that the spring constant increases at the time when the compression amount reaches the prescribed value. In detail, as illustrated in FIG. 12(A), the first spring 163A and the second spring 163B are prepared in advance such that the first spring 163A has the natural length LA0 greater than the distance L4 (See FIG. 11(C)) between the bottom face 62711 of the spring guide hole 6271 of the slide cam 162 and the groove bottom 16417C of the groove 16417 formed in the bottom portion 16415 of the case body 1641 in the initial state of the damper 16 and the second spring 163B has the natural length LB0 smaller than the distance L4 between the bottom face 62711 of the spring guide hole 6271 of the slide cam 162 and the groove bottom 16417C of the groove 16417 formed in the bottom portion 16415 of the case body 1641 in the initial state of the damper 16 and has the inner diameter r2 larger than the outer diameter r1 of the first coil spring 163A. Then, as illustrated in FIG. 12(B), the combination spring 163 is constructed by inserting the first coil spring 163A into the inside of the second coil spring 163B so that the outer periphery of the first coil spring 163A is surrounded by the second coil spring 163B.

When the combination spring 163 is compressed in the direction of axis O, only the first coil spring 163A protruding from at least one end 1632B of the second coil spring 163B is compressed (FIG. 12(B)) up to the compression amount corresponding to the difference of the natural lengths (LA0-LB0) between the first and second coil springs 163A and 163B, and thus the combination spring 163 functions as a compression spring having the same spring constant as that of the first coil spring 163A. When the compression amount becomes larger than that, both the first coil spring 163A and the second coil spring 163B are compressed (FIG. 12(C)), and thus the combination spring 163 functions as a compression spring having a spring constant corresponding to the sum of the spring constants of the first and second coil springs 163A and 163B.

The combination spring 163 having the non-linear spring characteristics described above is placed as follows in the inside of the below-described case body 1641 in the initial state of the damper 16. The first coil spring 163A is place in a preloaded state between the bottom face 62711 of the spring guide hole 6271 formed in the slide cam 162 and the groove bottom 16417C of the groove 16417 formed in the bottom portion 16415 of the case body 1641 so that the cam face 1622 of the slide cam 162 is pressed against the cam face 1612 of the rotating cam 161. In the initial state of the damper 16, each inclined cam face 1621 of the slide cam 162 is pressed against the cam face 1612 of the rotating cam 161 being biased by the preloaded first coil spring 163A, so as to be located in initial position determined by each step face 619 (See FIG. 14(E)) in the cam face 1612 of the rotating cam 161. On the other hand, the second coil spring 163B is placed in an unloaded state between the bottom face 62711 of the spring guide hole 6271 of the slide cam 162 and the groove bottom 16417C of the groove 14617 formed in the bottom portion 16415 of the case 164. In other words, the combination spring 163 functions as a spring having the same spring constant as that of the first coil spring 163A in the initial state of the damper 16. When the combination spring 163 is compressed by more than the difference of the natural lengths (LA0-LB0) between the first and second coil springs 163A and 163B, the combination spring 163 functions as a spring having the spring constant larger than that in the initial state of the damper 16.

In the present embodiment, the first coil spring 163A having the greater natural length than that of the second coil spring 163B is placed in the inside of the second coil spring 163B in the nested state. On the contrary, it is possible that the second coil spring 163B is placed in the inside of the first coil spring 163A having the greater natural length than that of the second coil spring 163B in a nested state.

Further, in the inside of the below-described case body 1641, one end 1631A of the first coil spring 163A is in contact with the bottom face 62711 of the spring guide hole 6271 of the slide cam 162, and the other end 1632A is in contact with the groove bottom 16417C of the groove 16417 formed in the bottom portion 16415 of the case body 1641 (See FIG. 11(C)). Thus, it is favorable that both ends 1631A and 1632A of the first coil spring 163A are polishing-processed closed ends so that both ends 1631A and 1632A of the first coil spring 163A are stable in the contact state. This is same for both ends 1631B and 1632B of the second coil spring 163B.

Figure 13:
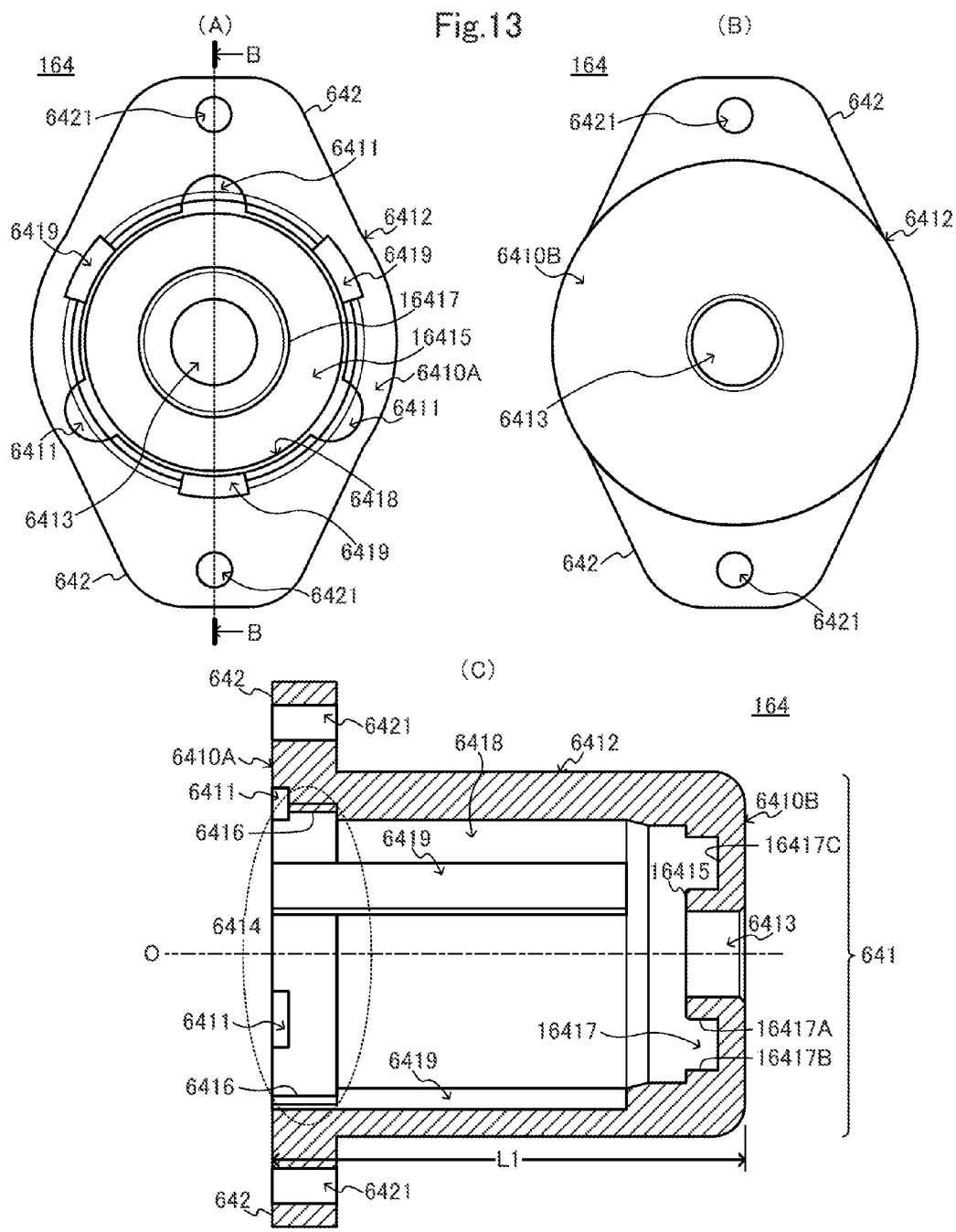
FIGS. 13(A) and 13(B) are left and right side views of a case 164, and FIG. 13(C) a B-B cross-section of FIG. 13(A)

FIGS. 13(A) and 13(B) are left and right side views of the case 164, and FIG. 13(C) a B-B cross-section of FIG. 13(A).

As illustrated, the case 164 integrally comprises: the case body 1641 of a bottomed cylindrical shape; and the two flange portions 642 projecting in radial directions from the outer periphery 6412 of the case body 1641.

The cover 65 is fitted in an opening 6414 of the case body 1641. In the inner periphery of the opening 6414, is formed a threaded portion 6416 into which a threaded portion 652 of the outer periphery 651 of the cover 65 is screwed. By tightening of this threaded portion 6416 and the threaded portion 652 in the outer periphery 651 of the cover, the cover 65 is fitted in the opening 6414 of the case body 641 while preloading the first coil spring 163A housed in the case body 1641. In an edge portion of the case body 1641, a plurality of recessed portions 6411 for welding, which are used for fixing the cover 65 fitted in the opening 6414, are formed at almost regular angular intervals about the axis O of the case body 1641.

In the central area of the bottom portion 16415 of the case body 1641, are formed a through-hole 6413, through which the axis O of the case body 1641 passes, and a ring-shaped groove 16417 surrounding the outer circumference of the through-hole 6413. The one end 1631A of the first coil spring 163A is set on the inner wall surface 16417A of the groove 16417 on the inner diameter side, so that the inner wall surface 16417A functions as an inner-diameter spring guide for fixing the position of this end 1631A. On the other hand, the one end 1631B of the second coil spring 163B is set on the inner wall surface 16417B of the groove 14617 on the outer diameter side, so that the inner wall surface 16417B functions as an outer-diameter spring guide for fixing the position of this end 1631B.

Further, in the inner periphery 6418 of the case body 1641, are formed three grooves 6419 along the direction of the axis O of the case body 1641 at almost regular angular intervals about the axis O of the case body 1641. One end of each groove 6419 passes through the opening-side end face 6410A of the case body 1641. When the slide cam 162 is inserted through the opening 6414 of the case body 1641, projecting portions 623 on the outer periphery 624 of the slide cam 162 are slidably inserted into these grooves 6419. By this, rotational movement of the slide cam 162 relative to the case 164 is constrained. In other words, rotational movement of the slide cam 162 relative to the pedal bracket 5 is constrained.

Although, in the present embodiment, the three grooves 6419 are formed in the inner periphery 6418 of the case body 1641 at almost regular angular intervals about the axis O, the number and layout of the grooves 6419 are determined in accordance with the number and layout of the projecting portions 623 of the slide cam 162 that is used.

On the other hand, the two flange portions 642 are formed integrally with the outer periphery 6412 of the case body 1641 so as to project outward from both sides of the end face 6410A on the opening side of the case body 1641. In these flange portions 642, are formed the bolt insertion holes 6421 for inserting the bolts 8 at positions that correspond to the respective bolt insertion holes in the other side plate 53 of the pedal bracket 5 when a through-hole 653 formed in the central area of the cover 65 fitted in the opening 6414 of the case body 1641 is aligned with the pin insertion hole 531 of the other side plate 53 of the pedal bracket 5.

Figure 6:
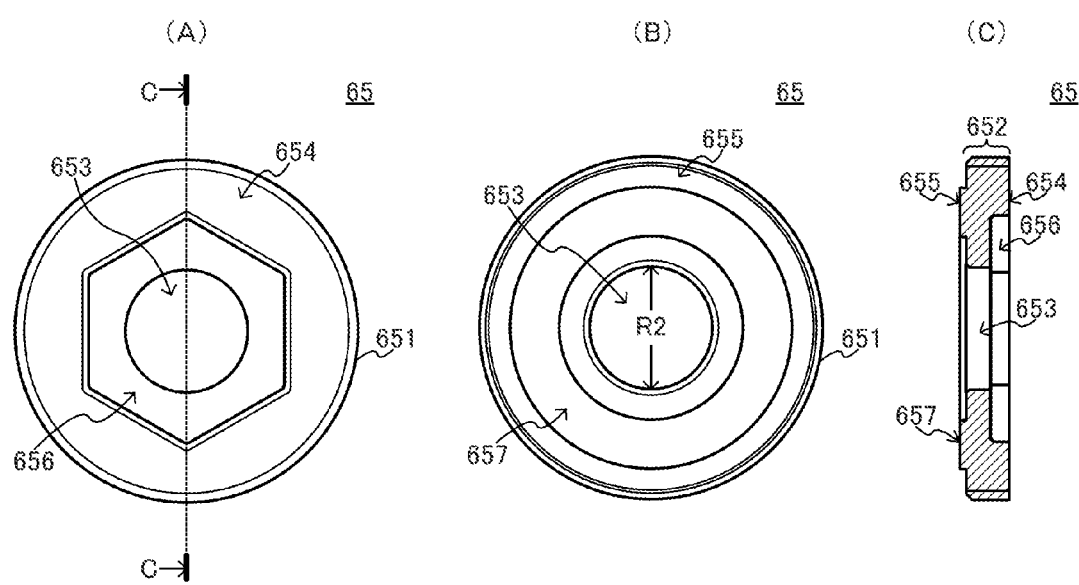
FIGS. 6(A) and 6(B) are a front view and a back view of a cover 65, and FIG. 6(C) a C-C cross-section of FIG. 6(A)

The cover 65 has similar construction to the cover 6 of the first embodiment (See FIG. 6). That is to say, in the outer periphery 651 of the cover 65, is formed the threaded portion 652 that is screwed into the threaded portion 6416 formed in the opening 6414 of the case body 1641. In one surface (the surface to be faced toward the outside of the case body 1641) 654 of the cover 65, is formed a hexagon socket 656 for inserting a tool for rotating the cover 65 relative to the case body 1641. On the other surface (the rear surface to be faced toward the inside of the case body 1641) 655 of the cover 65, is formed a seating face 657 with which the bottom face 617 of the rotating cam 161 is in sliding contact in the course of rotation. By rotating the tool inserted in the hexagon socket 656 in the surface 654 of the cover 65, the threaded portion 652 formed in the outer periphery 651 of the cover 65 is tightened into the threaded portion 6416 formed in the opening 6414 of the case body 1641, and thereby the bottom face 617 of the rotating cam 161 is pressed by the seating face 657 of the cover 65. As a result, the rotating cam 161 and the slide cam 162 are pressed into initial positions within the case body 1641. At that time, only the first coil spring 163, whose natural length is greater than the distance between the bottom face 62711 of the spring guide hole 6271 of the slide cam 162 and the groove bottom 16417C of the groove 16417 formed in the bottom portion 16415 of the case body 1641, is preloaded between the groove bottom 16417C of the bottom portion 16415 of the case body 1641 and the bottom face 62711 (See FIG. 15(D)) of the spring guide hole 6271 of the slide cam 162.

Further, in the central area of the cover 65, is formed the through-hole 653 having the inner diameter R2 larger than the outer diameter R1 of the damper connecting section 42 of the pedal pivot pin 4. In an assembled state of the damper 16, the axis O of the case body 1641 passes through the through-hole 653, the inside of the rotating cam 161, and the through-hole 6413 in the bottom portion 16415 of the case body 1641 (See FIG. 11(C)). The pedal pivot pin 4 is inserted, first the side of the support section 41, into the through-hole 653, and passes through the inside of the rotating cam 161, so as to protrude from the through-hole 6413 of the bottom portion 16415 of the case body 1641.

FIGS. 14(A), 14(B) and 14(C) are a front view and left and right side views of the rotating cam 161, FIG. 14(D) a D-D cross-section of FIG. 14(C), and FIG. 14(E) a view illustrating schematically a profile shape of the cam face 1612 on the pitch circle 615 centering at the axis O.

As illustrated, the rotating cam 161 has a stepped cylindrical shape including the cam guide portion 613 as a smaller-diameter portion and a cam portion 1610 as a large-diameter portion that are formed integrally. The cam guide portion 613 is an inner-diameter guide for the slide cam 162 and inserted into the inside of the slide cam 162. On the other hand, the cam portion 1610 has the cam face 1612 on which the inclined cam faces 1621 of the slide cam 162 slide.

Into the inside of the rotating cam 161, the pedal pivot pin 4 is inserted from one end face 616 toward the other end face (bottom face), after passing through the through-hole 653 of the cover 65. In an inner wall 614 of the rotating cam 161, are formed two flat surfaces 618 facing each other at a width-across-flat T1 corresponding to the width-across-flat t1 of the damper connecting section 42 of the pedal pivot pin 4. When the damper connecting section 42 of the pedal pivot pin 4 is inserted into the inside of the rotating cam 161, these flat surfaces 618 come in contact with the corresponding flat surfaces 423 of the damper connecting section 42 of the pivot pin 4, so that the torque of the pedal pivot pin 4 is transmitted to the rotating cam 161. As a result, associated with rotation of the pedal pivot pin 4 in both directions α and β caused by operation of the accelerator pedal 21, the rotating cam 161 also rotates in both directions α and β about the axis O while generating friction resistance, for example, between the inclined cam faces 1611 formed in the cam face 1612 and the inclined cam faces 1621 of the slide cam 162.

On the pitch circle 615 centering at the axis O, the cam face 1612 (the face on the side of the cam guide portion 613) of the cam portion 1610 periodically repeats concave forms and convex forms in the direction of the axis O. In detail, in the cam face 1612 of the cam portion 1610, three inclined cam faces 1611 inclined at a prescribed angle W to the circumferential direction of the pitch circle 615 (the rotation direction of the pedal pivot pin 4 and the like) are formed at almost regular angular intervals about the axis O. Further, between each pair of adjacent inclined cam faces 1611, is formed a step face 619 for determining the initial position of an inclined cam face 1621 of the slide cam 162. When the rotating cam 161 rotates in the normal rotation direction α relative to the slide cam 162, each inclined face 1621 of the slide cam 162 goes sliding on the corresponding inclined cam 1611 in the direction of getting away from the initial position determined by the corresponding step face 619. When the rotating cam 161 rotates in the reverse rotation direction β relative to the slide cam 162, each inclined cam face 1621 of the slide cam 162 goes sliding on the corresponding inclined cam face 1611 toward the initial position determined by the corresponding step face 619.

Figure 15:
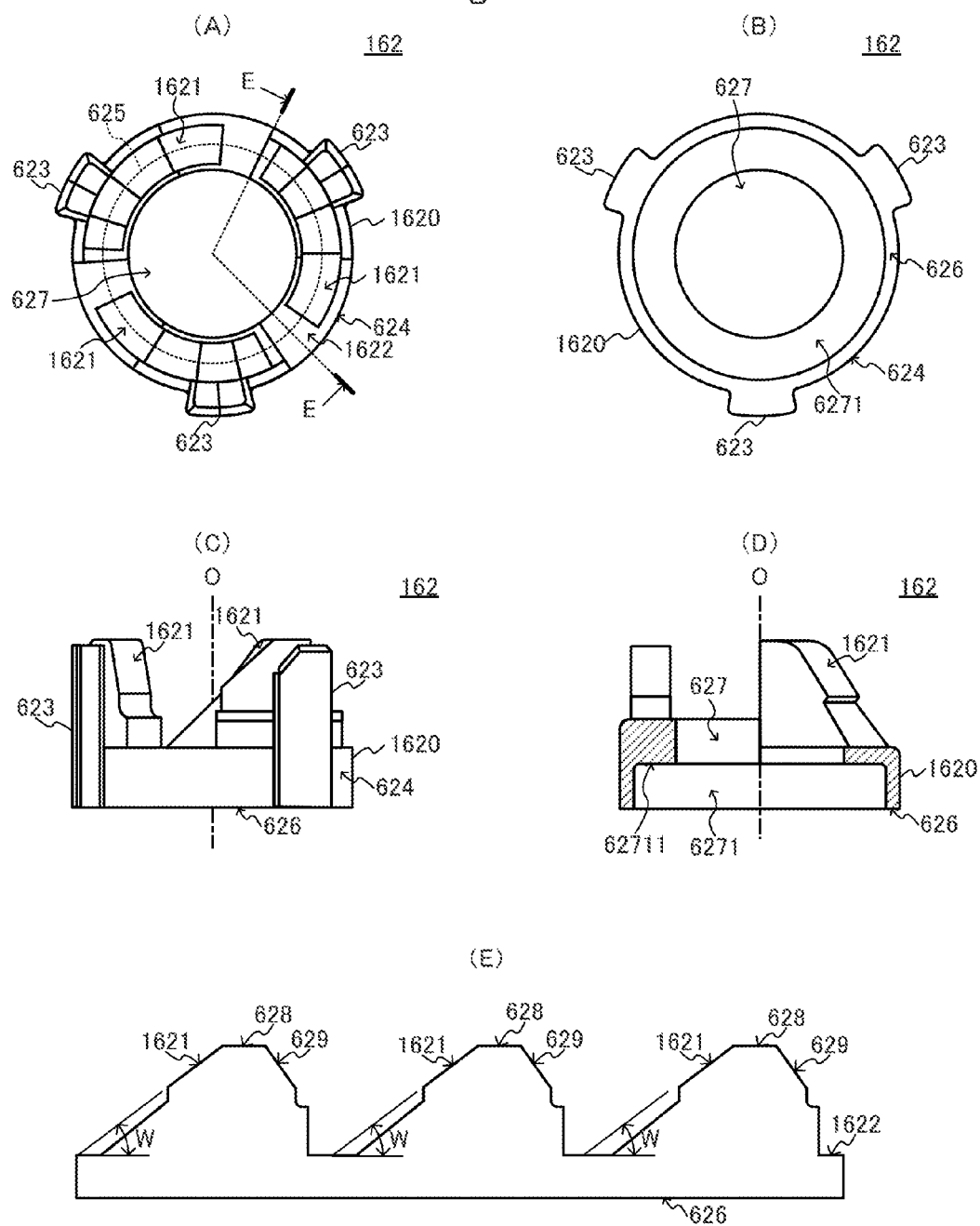
FIGS. 15(A), 15(B) and 15(C) are a front view, a back view and a side view of a slide cam 162, FIG. 15(D) an E-E cross-section of FIG. 15(A), and FIG. 15(E) a view illustrating schematically a profile shape of a cam face 1622 on a pitch circle 625 centering at the axis O.

FIGS. 15(A), 15(B) and 15(C) are a front view, a back view and a side view of the slide cam 162, FIG. 15(D) an E-E cross-section of FIG. 15(A), and FIG. 15(E) a view illustrating schematically a profile shape of the cam face 1622 on the pitch circle 625 centering at the axis O.

The slide cam 162 comprises: a cylindrical cam portion 1620, into which the cam guide portion 613 of the rotating cam 161 is slidably inserted; and projecting portions 623 formed on the outer periphery 624 of the cam portion 1620 along the axis O of the cam portion 1620.

In the inner periphery of the cam portion 1620, is formed a stepped hole 627 having a spring guide hole 6271 as a large-diameter portion on the side of a bottom face 626 of the cam portion 1620. This spring guide hole 6271 encloses the one end 1631A of the first coil spring 163A, and the bottom face 62711 of the spring guide hole 6271 receives the one end 1631A of the first coil spring 163A from the initial state of the damper 16. Further, the spring guide hole 6271 encloses the one end 1631B of the second coil spring 163B, and in the course of operation of the damper 16, guides the one end 1631B of the second coil spring 163B toward the bottom face 62711.

On the pitch circle 625 centering at the axis O, the cam face (the face opposite to the bottom face 626) 622 of the cam portion 1620 periodically repeats concave forms and convex forms in the direction of the axis O. In detail, in the cam face 1622 of the cam portion 1620, three inclined cam faces 1621 inclined at nearly the same angle W as that of the inclined cam faces 1611 of the rotating cam 161 to the circumferential direction of the pitch circle 625 (the rotation direction of the pedal pivot pin 4 and the like) are formed at almost regular angular intervals about the axis O. Further, for each inclined cam face 1621, are formed a flat face 628 which follows the inclined cam face 1621, and an inclined face 629 that comes in contact with a step face 619 in the cam face 1612 of the rotating cam 161.

When the cam guide portion 613 of the rotating cam 161 is inserted into the inside of the cam portion 1620 in a state that the cam face 1622 of the cam portion 1620 is faced toward the cam face 1612 of the rotating cam 161, the cam guide portion 613 of the rotating cam 161 protrudes from the side of the bottom face 626 of the cam portion 1620. The cam guide portion 613 protruding from the side of the bottom face 626 of the cam portion 1620 is inserted into the inside of the combination spring 163 (the inside of the first coil spring 163A placed within the second coil spring 163B), and the spring guide hole 6271 of the cam portion 1620 is made to enclose the one end 1631A of the first coil spring 163A and the one end 1631B of the second coil spring 163B.

The combination spring 163, the slide cam 162 and the rotating cam 161, which are assembled in the above way, are housed, first the side of the other end 1632A of the first coil spring 163A, into the case body 1641 through the opening 6414 of the case body 1641, after the projecting portions 623 of the slide cam 162 are aligned with the grooves 6419 in the inner periphery 6418 of the case body 1641.

The free length LA0 of the first coil spring 163A is greater than the distance L4 between the groove bottom 16417C of the groove 16417 formed in the bottom portion 16415 of the case body 1641 and the bottom face 62711 of the spring guide hole 6271 of the slide cam 162 in the initial state of the damper 16. Accordingly, when the cover 65 is screwed in the opening 6414 of the case body 1641, only the first coil spring 163A is preloaded between the groove bottom 16417C of the bottom portion 16415 of the case body 1641 and the bottom face 62711 of the spring guide hole 6271 of the slide cam 162. On the other hand, the free length LB0 of the second coil spring 163B is smaller than the distance L4 between the groove bottom 16417C of the groove 16417 formed in the bottom portion 16415 of the case body 1641 and the bottom face 62711 of the spring guide hole 6271 of the slide cam 162 in the initial state of the damper 16. Thus, the second coil spring 163B is not compressed only by screwing the cover 65 in the opening 6414 of the case body 1641. Thus, in the initial state of the damper 16, only the first coil spring 163A biases the slide cam 162 toward the direction of pressing the inclined cam faces 1621 of the slide cam 162 against the inclined cam faces 1611 of the rotating cam 161. This causes rotation of the rotating cam 161, and thereby the inclined cam faces 1621 in the cam face 1622 of the slide cam 162 come in contact with the respective step faces 619 in the cam face 1612 of the rotating cam 161. This position becomes the initial position of the inclined cam faces 1621 of the slide cam 162 relative to the inclined cam faces 1611 of the rotating cam 161. Thereafter, when, due to rotation of the rotating cam 161, the slide cam 162 moves toward the bottom portion 16415 of the case 164 and reaches the prescribed position, the first coil spring 163A and the second coil spring 163B are both compressed between the groove bottom 16417C of the bottom portion 16415 of the case body 1641 and the bottom face 62711 of the spring guide hole 6271 of the slide guide 162.

Owing to the above-described construction, the accelerator pedal unit 11 of the present embodiment makes it possible that a suitable load is applied on a driver's foot during pressing down of the accelerator pedal 21 and the load applied on the driver's foot becomes rapidly larger by magnitude that can be detected by tactile sensation at the time when the accelerator pedal 21 is pressed to the prescribed position where the energy expenditure rate of the automobile deteriorates to the prescribed level (i.e. when the pedal pivot pin 4 rotates to the prescribed angle θ1 in the normal rotation direction α), as described in the following.

Figure 16:
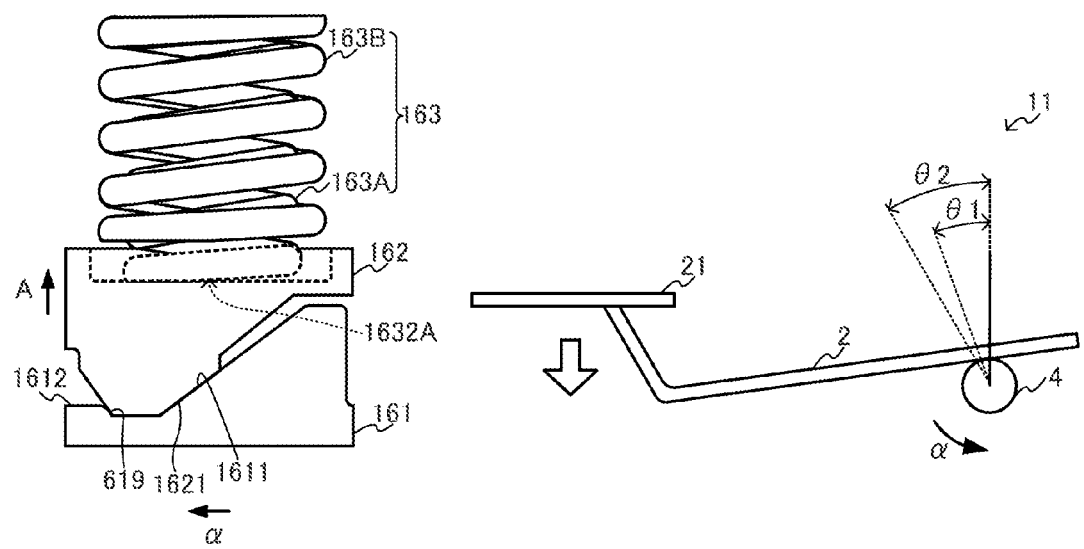
FIG. 16 is a view for explaining two-stage damper motion of the damper 16 associated with pressing the accelerator pedal 21.
Figure 17:
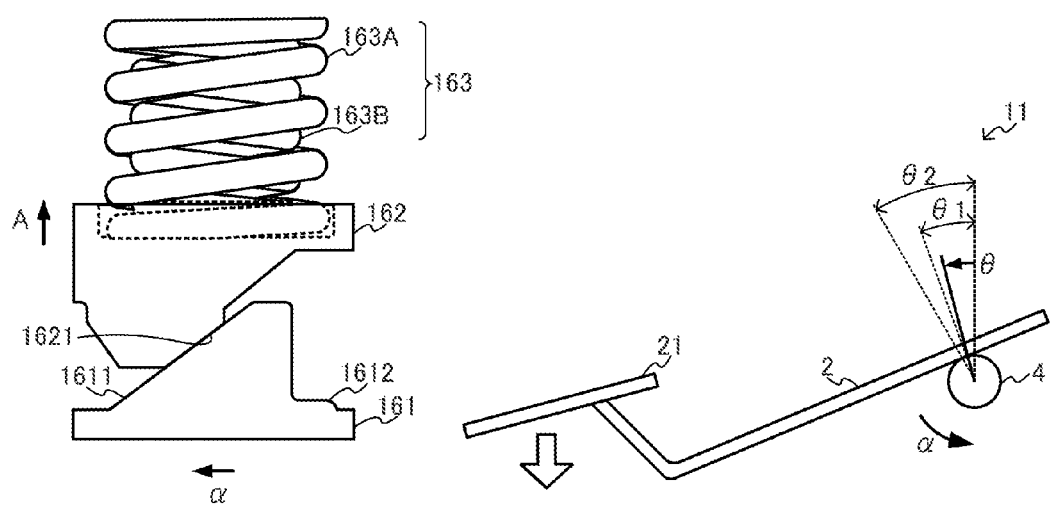
FIG. 17 is a view for explaining two-stage damper motion of the damper 16 associated with pressing the accelerator pedal 21.
Figure 18:
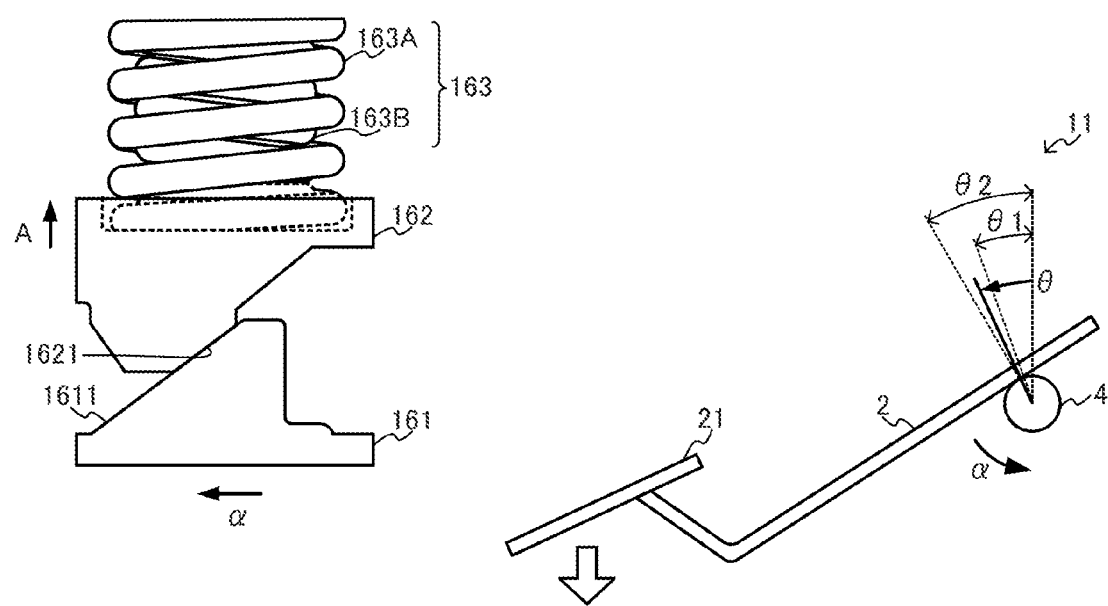
FIG. 18 is a view for explaining two-stage damper motion of the damper 16 associated with pressing the accelerator pedal 21.

FIGS. 16-18 are views for explaining two-stage damping motion of the damper 16 associated with pressing the accelerator pedal 21.

As illustrated in FIG. 16, in the initial state of the damper 16 (the state where the accelerator pedal 21 is not pressed), each inclined cam face 1621 of the slide cam 162 of the damper 16 is located in the initial position determined by the corresponding step face 619 of the cam face 1612 of the rotating cam 161.

When the accelerator pedal 21 is pressed down, the pedal pivot pin 4 rotates in the normal direction α interlocking with swinging of the accelerator pedal arm 2. At that time, within the damper 16, the flat surfaces 423 of the damper connecting section 42 of the pedal pivot pin 4 come in contact with the respective opposed flat surfaces 618 in the inner wall of the rotating cam 161, so that the rotating cam 161 is rotated in the normal rotation direction α. Until the rotating cam 61 rotates to the prescribed angle θ1 in the normal rotation direction α, the slide cam 162 moves in the direction A of getting away from the rotating cam 161 (the direction toward the bottom portion 16415 of the case 164) while each inclined cam face 1621 is in sliding contact with the corresponding inclined cam face 1611 of the rotating cam 161. During this, only the first coil spring 163A is gradually compressed from the initial preloaded state, so that each inclined cam face 1621 of the slide cam 162 is pressed more and more strongly against the corresponding inclined cam face 1611 of the rotating cam 161. In other words, the combination spring 163 functions as a compression spring having the same spring contact as that of the first coil spring 163A. Accordingly, the friction resistance, for example, between the inclined cam faces 1621 of the slide cam 162 and the inclined cam faces 1611 of the rotating cam 161 gradually increases, and the torque of the rotating cam 161 in the rotation direction about the axis O increases gradually with increase of the rotation angle θ of the rotating cam 161 in the normal rotation direction α relative to the slide cam 162. As a result, rotation of the pedal pivot pin 4 in the normal rotation direction α is damped, and the suitable load is applied on the driver's foot that presses the accelerator pedal 21.

As illustrated in FIG. 17, when the accelerator pedal 21 is pressed to the position where the energy expenditure rate of the automobile deteriorates to the prescribed level (i.e. when the pedal pivot pin 4 rotates to the prescribed angle θ1 in the normal rotation direction α), the slide cam 162 moves toward the bottom portion 16415 of the case 164 up to the position where the one end 1631B of the second coil spring 163B comes in contact with the bottom face 62711 of the spring guide hole 6271 of the slide cam 162, with each inclined cam face 1621 in sliding contact with the corresponding inclined cam face 1611 of the rotating cam 161. As a result, at the time when the rotating cam 161 rotates to the prescribed angle θ1 in the normal rotation direction α, also the second coil spring 163B together with the first coil spring 163A starts to bias the slide cam 162 so as to press each inclined cam face 1621 of the slide cam 162 against the corresponding inclined cam face 1611 of the rotating cam 161. In other words, the combination spring 163 functions as a compression spring that has a spring constant corresponding to the sum of the spring constants of the first and second coil springs 163A and 163B. Accordingly, each cam face 1621 of the slide cam 162 is pressed against the corresponding cam face 1611 of the rotating cam 161 and the bottom face 617 of the rotating cam 161 against the seating face 657 of the cover 65 by force that is greater by additional biasing force of the second coil spring 163B than the force at the time when only the first coil spring 163A biases the slide cam 162, and thus the torque of the rotating cam 161 in the rotation direction about the axis O increases rapidly. Thus, at the time when the accelerator pedal 21 is pressed to the position where the energy expenditure rate of the automobile deteriorates to the prescribed level, the load applied on the driver's foot that presses the accelerator pedal 21 becomes rapidly larger by at least magnitude such that a variation of load can be detected by tactile sensation.

As illustrated in FIG. 18, when the driver continues pressing down the accelerator pedal 21 furthermore (i.e. when the pedal pivot pin 4 rotates over the prescribed angle θ1 in the normal rotation direction α), then the slide cam 162 moves toward the bottom portion 16415 of the case 164 with each inclined cam face 1621 in sliding contact with the corresponding inclined cam face 1611 of the rotating cam 161, so that the first coil spring 163A and the second coil spring 163B are compressed furthermore. Accordingly, the inclined cam faces 1621 of the slide cam 162 are pressed further strongly against the inclined cam faces 1611 of the rotating cam 161, and the bottom face 617 of the rotating cam 161 is pressed further strongly against the seating face 657 of the cover 65. Accordingly also after increase of the spring constant, the friction resistance, for example, between the inclined cam faces 1621 of the slide cam 162 and the inclined cam faces 1611 of the rotating cam 161 further increases gradually with increase of the rotation angle θ of the rotating cam 161 in the normal rotation direction α, and the torque of the rotating cam 161 in the rotation direction about the axis O increases gradually. As a result, also after the rapid increase of the load applied on the driver's foot that presses down the accelerator pedal 21, the load applied on the driver's foot that presses the accelerator pedal 21 further increases gradually as long as the driver continues pressing down the accelerator pedal 21. Accordingly, the driver can intuitively grasp the continuous worsening of the energy expenditure rate of the automobile through operation of pressing the accelerator pedal 21 without constantly caring about a change of visual information obtained from the meters on the instrument panel.

As described hereinabove, according to the accelerator pedal unit 11 of the present embodiment, the pedal pivot pin 4, which is rotated by operation (i.e. pressing and releasing) of the accelerator pedal 21, is connected to the damper 16 whose resisting force for damping rotation of the pedal pivot pin 4 increases stepwise according to the rotation angle θ of the pedal pivot pin 4 in the normal rotation direction α. At the time when the pedal pivot pin 4 rotates in the normal rotation direction α to the prescribed rotation angle θ1 at which the energy expenditure rate of the automobile deteriorates to the prescribed level, the damper 16 rapidly increases the force of damping rotation of the pedal pivot pin 4. Thus, it is possible that, while a suitable load is applied on the driver's foot pressing the accelerator pedal 21, when the accelerator pedal 21 is pressed to the position where the energy expenditure rate of the automobile worsens to the prescribed level, the load applied on the driver's foot becomes rapidly heavier by at least magnitude that can be detected by tactile sensation. Thus, the driver can detect a rapid change in operational feeling of pressing the accelerator pedal 21 as a signal for energy-saving driving of the automobile while driving.

Further, when the driver continues pressing down the accelerator pedal 21 (i.e. when the pedal pivot pin 4 rotates over the prescribed angle θ1 in the normal rotation direction α), the friction resistance, for example, between the inclined cam faces 1621 of the slide cam 162 and the inclined cam faces 1611 of the rotating cam 161 increases furthermore with increase of the rotation angle θ of the rotating cam 161 in the normal rotation direction α, and the torque of the rotating cam 161 in the rotation direction about the axis O increases furthermore. Accordingly, the load applied on the driver's foot that presses down the accelerator pedal 21 further increases gradually even after the rapid increase of the load. Therefore, the driver can intuitively grasp the continuous worsening of the energy expenditure rate of the automobile through operation of pressing the accelerator pedal 21.

In the present embodiment, the non-linear spring whose elastic constant increases at the time when the spring is compressed to the prescribed compression amount is constructed as the combination spring in which two coil springs 163A and 163B having different natural lengths from each other are arranged in the nested state, and this non-linear spring biases the slide cam 162. At the time when the rotating cam 161 rotates to the prescribed angle $\theta 1$ in the normal rotation direction $\alpha$, the torque of the pedal pivot pin 4 in the rotation direction about the axis O is increased by at least magnitude such that the driver can detect as a change in operational feeling of the accelerator pedal 21. However, this is not indispensable.

For example, the combination spring 163 can be constructed by arranging three or more coil springs having different natural lengths from each other in a nested state. In that case, the driver can detect change in the traveling state of the automobile in more-finely-divided stages.

Further, instead of the combination spring 163 comprising the two spring coils 163A and 163B having the different natural lengths from each other, it is possible to use a non-linear spring such as an irregular pitch coil spring or a tapered coil spring, whose spring constant changes stepwise in the course of compression. When such a non-linear spring is used, the spring constant of the non-linear spring increases in a prescribed range of rotation angle including the time when the rotating cam 161 rotates to the prescribed angle $\theta 1$ in the normal rotation direction $\alpha$. Therefore, the torque of the pedal pivot pin 4 in the rotation direction about the axis O can be increased by increment such that the driver can detect a change in operational feeling of the accelerator pedal 21 at the time when the rotating cam 161 rotates to the prescribed rotation angle $\theta 1$ in the normal rotation direction $\alpha$.

In the present embodiment, the coil springs 163A and 163B are used for biasing the slide cam 162. However, another elastic body such as rubber, a spring other than the coil spring, or the like may be used.

In the above-described first and second embodiments, the outer periphery 421 of the damper connecting section 42 of the pedal pivot pin 4 is formed to have the two flat surfaces and the opposed two flat surfaces 618 are formed in the inner wall 614 of the rotating cam 61, 161 of the damper 6, 16, so that the rotating cam 61, 161 of the damper 6, 16 rotates interlocking with rotation of the pedal pivot pin 4. However, this is not indispensable. It is sufficient that the outer periphery 421 of the damper connecting section 42 of the pedal pivot pin 4 and the inner wall 614 of the rotating cam 61, 161 of the damper 6, 16 include respective surfaces that interfere with each other, and rotation of the pedal pivot pin 4 is transmitted to the rotating cam 61, 161 of the damper 6, 16 by means of contact between these surfaces. For example, it is possible that the outer periphery 421 of the damper connecting section 42 of the pedal pivot pin 4 and the inner wall 614 of the rotating cam 61, 161 of the damper 6, 16 are each formed to have one flat surface or three or more flat surfaces so that the respective surfaces of the damper connecting section 42 and the inner wall 614 of the rotating cam 61, 161 come in contact with each other when the pedal pivot pin 4 rotates. Or, both a cross-section shape of the damper connecting section 42 of the pedal pivot pin 4 and a contour shape of the inner wall 614 of the rotating cam 61, 161 of the damper 6, 16 can be polygonal shapes. Or, one or more recessed portions may be formed in the outer periphery 421 of the pedal pivot pin 4 and one or more projecting portions to fit in these recessed portions may be formed in the inner wall 614 of the rotating cam 61, 161 of the damper 6, 16.

Further, the retaining ring 7 is used for preventing dropping-off of the pedal pivot pin 4 in the above-described first and second embodiments. However, another part for preventing dropping-off of the pedal pivot pin 4 can be used instead of the retaining ring 7. For example, in the case of using a bush nut or the like, which can be fixed without a groove, it is not necessary to form the groove 413 in the support section 41 of the pedal pivot pin 4.

The above-described first and second embodiments take the examples of the accelerator pedal units 1 and 11 for an automobile. However, the present invention can be applied to operation units of various apparatuses such as musical instruments, game machines, various devices, and the like without limiting to an accelerator pedal unit 1, 11, as far as it is useful to give, as a signal of occurrence of a predetermined event, a change in operational feeling of an operating part such as a pedal and a steering wheel to an operator at the time when the operator moves the operating part to a prescribed position by manual operation with hand, foot, or the like. In the damper 6 of the first embodiment, the number of the inclined cam faces, the inclination angles of the plurality of inclined areas included in the inclined cam faces, and sequential order of the inclined areas can be determined suitably depending on the intended use of the operation unit. Similarly, in the damper 16 of the second embodiment, the number of coil springs combined in the nested state as components of the combination spring 163 can be determined suitably depending on the intended use of the operation unit.

Further, in the damper 6 of the first embodiment, it is possible to use the combination spring 163 of the damper 16 of the second embodiment instead of the coil spring 63. By this, the stepwise change in the resisting force for damping rotation of the pedal pivot pin 4 according to the rotation angle $\theta$ of the pedal pivot pin 4 in the normal rotation direction $\alpha$ can be realized by a plurality of inclined areas of different inclination angles provided in the inclined cam faces 611 of the rotating cam 61 and a plurality of coil springs of different coil lengths as elements of the combination spring 163, and thus the resisting force can be changed stepwise in more-finely-divided stages. Accordingly, the driver can detect a change in the traveling state of the automobile in more-finely-divided stages.

INDUSTRIAL APPLICABILITY

The present invention can be widely applied to cases where it is beneficial for a user operating manually an operating part to grasp intuitively occurrence of a prescribed event.

REFERENCE SIGNS LIST

1, 11: accelerator pedal unit; 2: accelerator pedal arm; 3: spring; 4: pedal pivot pin; 5: pedal bracket; 6, 16: damper; 7: retaining ring; 8: bolt; 9: nut; 21: accelerator pedal; 41: support section; 42: damper connecting section; 43: pedal arm fixing section; 51: bottom plate; 52, 53: side plate; 61, 161: rotating cam; 62, 162: slide cam; 63: coil spring; 64, 164: case; 65: cover; 411: outer periphery of dropping-off preventing section; 412: end face of pedal pivot pin; 413: groove; 421: outer periphery of damper connecting section; 423: flat surface; 425: support area; 431: outer periphery of pedal arm fixing section; 422, 432: step surface of pedal pivot pin; 521, 531: pin support hole; 610, 1610: cam portion; 611, 1611: inclined cam face; 611A: first inclined area; 611B: second inclined area; 612, 1612: cam face; 613: cam guide portion; 614: inner wall of rotating cam; 615: pitch circle; 616, 617: end face of rotating cam; 618: flat surface of rotating cam's inner wall; 619: step face; 620, 1620: cam portion; 621, 1621: inclined cam face; 622, 1622: cam face; 623: projecting portion; 624: outer periphery of cam portion; 625: pitch circle; 626: bottom face of cam portion; 627: stepped hole; 628: flat surface; 629: inclined face; 631, 632: end of coil spring; 641, 1641: case body; 642: flange portion; 651: outer periphery of cover; 652: threaded portion; 653: through-hole; 654: surface of cover; 655: rear surface of cover; 656: hexagon socket; 657: seating face for rotating cam; 6410A, 6410B: end face of case body; 6411: recessed portion for welding; 6412: outer periphery of case body; 6413: through-hole; 6414: opening of case body; 6415: bottom face of case body; 6416: threaded portion; 6417: spring guide portion; 6418: inner periphery of case body; 6419: groove; 6421: bolt insertion hole; 6271: spring guide hole; 163: combination spring; 163A: first coil spring; 163B: second coil spring; 16415: bottom of case body; 16417: groove; 16417A, 16417B: inner wall of groove; and 16417C: groove bottom.

The invention claimed is:

1. A damper for damping rotation of a rotating shaft, comprising:
   a pair of cam members each having an inclined cam face inclined with respect to a rotation direction of the rotating shaft, upon a torque of the rotating shaft being transmitted to the cam members, the cam members rotating relative to each other about an axis of the rotating shaft and moving relative to each other in an axial direction of the rotating shaft with the inclined cam faces in sliding contact with each other;
   a housing part housing the pair of cam members and having an inner side surface, the pair of cam members moving and rotating relative to each other slide on the inner side surface;
   an elastic body placed within the housing part so as to be compressed in the axial direction of the rotating shaft by an increase of an amount of the relative movement of the pair of cam members in the axial direction, and biasing the pair of cam members in the axial direction of the rotating shaft; and
   at least two inclined areas formed in the inclined cam face of at least one of the pair of cam members, inclined at different angles from each other with respect to the direction of the relative rotation of the pair of cam members, and arranged in the direction of the relative rotation of the pair of cam members, wherein:
   the elastic body presses the pair of cam members in the axial direction of the rotating shaft against an end portion of the housing part in the axial direction of the rotating shaft so as to allow the pair of cam members to press against each other at the inclined cam faces and then to rotate relatively each other while changing the inclined areas; and
   the inclined areas have different increase rates of pushing depth of the elastic body in the axial direction of the rotating shaft according to the relative rotation of the pair of cam members, whereby,
   an increase rate of a friction resistance impeding relative rotation of the pair of cam members according to an increase of a relative rotation angle of the pair of cam members is changed stepwise by changing force of pressing the pair of cam members against the end portion of the housing part in a stepwise manner.

2. A damper for damping rotation of a rotating shaft, comprising:
   a pair of cam members each having an inclined cam face inclined with respect to a rotation direction of the rotating shaft, upon a torque of the rotating shaft being transmitted to the cam members, the cam members rotating relative to each other about an axis of the rotating shaft and moving relative to each other in an axial direction of the rotating shaft with the inclined cam faces in sliding contact with each other;
   a housing part housing the pair of cam members and having an inner side surface, the pair of cam members moving and rotating relative to each other slide on the inner side surface; and
   an elastic body placed within the housing part so as to be compressed in the axial direction of the rotating shaft by an increase of a relative moving amount of the pair of cam members in the axial direction, and biasing the pair of cam members in the axial direction of the rotating shaft by restoring force, wherein:
   the elastic body has an elastic coefficient increasing stepwise with an increase of a compression amount of the elastic body, and presses the pair of cam members in the axial direction of the rotating shaft against an end portion of the housing part in the axial direction of the rotating shaft so as to allow the pair of cam members to press against each other at the inclined cam faces and then to rotate relatively each other; and
   the inclined cam faces increase the compression amount of the elastic body by increasing a relative rotation angle of the pair of cam members, whereby,
   an increase rate of a friction resistance impeding relative rotation of the pair of cam members according to an increase of the relative rotation angle of the pair of cam members is changed stepwise by changing force of pressing the pair of cam members against the end portion of the housing part in a stepwise manner.

3. An operation unit for receiving a manual operation by a user at an operating part, the operation unit comprising:
   an arm having the operating part;
   a pivot pin to which the arm is fixed so that the operating part is located at a position away from an axis of the pivot pin;
   a bracket which holds the pivot pin rotatably about the axis of the pivot pin by force to be given to the operating part by the manual operation; and
   a damper damping rotation of the pivot pin, comprising:
   a pair of cam members each having an inclined cam face inclined with respect to a rotation direction of the pivot pin upon a torque of the pivot pin being transmitted to the cam members, the cam members rotating relative to each other about the axis of the pivot pin and moving relative to each other in an axial direction of the pivot pin with the inclined cam faces in sliding contact with each other;
   a housing part fixed to the bracket, housing the pair of cam members, and having an inner side surface on which the pair of cam members slide while moving and rotating relative to each other;
   an elastic body placed within the housing part so as to be compressed in the axial direction of the pivot pin by an increase of a relative moving amount of the pair of cam members in the axial direction, and biasing the pair of cam members in the axial direction of the pivot pin; and at least two inclined areas formed in the inclined cam faces of at least one of the pair of cam members, inclined at different angles from each other with respect to a direction of the relative rotation of the pair of cam members, and arranged in the direction of the relative rotation of the pair of cam members, wherein:

the elastic body presses the pair of cam members in the axial direction of the rotating shaft against an end portion of the housing part in the axial direction of the rotating shaft so as to allow the pair of cam members to press against each other at the inclined cam faces and then to rotate relatively each other while changing the inclined areas; and the inclined areas have different increase rates of pushing depth of the elastic body in the axial direction of the rotating shaft according to the relative rotation of the pair of cam members, whereby, an increase rate of a friction resistance impeding relative rotation of the pair of cam members according to an increase of a relative rotation angle of the pair of cam members is changed stepwise by changing force of pressing the pair of cam members against the end portion of the housing part in a stepwise manner.

4. The operation unit of claim 3, wherein:

the arm has an accelerator pedal as the operating part; and the inclined cam face of at least one of the pair of cam members has as the at least two inclined areas: a first inclined area being in sliding contact with the inclined cam face of the other cam member until the accelerator pedal being pressed to a prescribed position; and a second inclined area having an inclination angle larger than an inclination angle of the first inclined area with respect to the direction of the relative rotation, and starting sliding contact with the inclined cam face of the other cam member on the accelerator pedal when the accelerator pedal is pressed to the prescribed position.

5. The operation unit of claim 4, wherein:

the inclined cam face of the other cam member is in contact with the second inclined area at a larger area than a contact area with the first inclined area.

6. An operation unit for receiving a manual operation by a user at an operating part, the operation unit comprising:

an arm having the operating part;

a pivot pin, the arm being fixed to the pivot pin so that the operating part is located at a position away from an axis of the pivot pin;

a bracket, which holds the pivot pin rotatably about the axis of the pivot pin by force to be given to the operating part by the manual operation; and a damper damping rotation of the pivot pin, the damper comprising:

a pair of cam members each having an inclined cam face inclined with respect to a rotation direction of the pivot pin, upon a torque of the pivot pin being transmitted to the cam members, the cam members rotating relative to each other about the axis of the pivot pin and moving relative to each other in an axial direction of the pivot pin with the inclined cam faces in sliding contact with each other;

a housing part fixed to the bracket, housing the pair of cam members, and having an inner side surface on which the pair of cam members slide while moving and rotating relative to each other; and an elastic body placed within the housing part so as to be compressed in the axial direction of the pivot pin by an increase of a relative moving amount of the pair of cam members in the axial direction, and biasing the pair of cam members in the axial direction of the pivot pin by restoring force so as to allowing the inclined cam faces of the pair of cam members to press against each other, wherein:

the elastic body has an elastic coefficient increasing stepwise with an increase of a compression amount of the elastic body, and presses the pair of cam members in the axial direction of the rotating shaft against an end portion of the housing part in the axial direction of the rotating shaft so as to allow the pair of cam members to press against each other at the inclined cam faces and then to rotate relatively each other; and the inclined cam faces increase the compression amount of the elastic body by increasing a relative rotation angle of the pair of cam members, whereby, an increase rate of a friction resistance impeding relative rotation of the pair of cam members according to an increase of the relative rotation angle of the pair of cam members is changed stepwise by changing force of pressing the pair of cam members against the end portion of the housing part in a stepwise manner.

7. The operation unit of claim 6, wherein:

the elastic body comprises a plurality of elastic members starting to be compressed in the axial direction at different times in a case of an increase of the relative moving amount of the pair of cam members in the axial direction.

8. The operation unit of claim 7, wherein:

the arm has an accelerator pedal as the operating part;

the elastic coefficient of the elastic body increases on the accelerator pedal when the accelerator pedal is to a prescribed position.

9. The operation unit of claim 7, wherein:

the plurality of elastic members are a plurality of coil springs that each have an uncompressed length that is different than any other of the plurality of coil springs and which are arranged in a nested state.

10. The operation unit of claim 9, wherein:

the arm has an accelerator pedal as the operating part; and the elastic coefficient of the elastic body increases on the accelerator pedal when the accelerator pedal is pressed to a prescribed position.

11. The operation unit of claim 6, wherein:

the arm has an accelerator pedal as the operating part;

the elastic coefficient of the elastic body increases on the accelerator pedal when the accelerator pedal is pressed to a prescribed position.

* * * * *